(12) United States Patent
Wagner et al.

(10) Patent No.: US 11,034,529 B2
(45) Date of Patent: Jun. 15, 2021

(54) SYSTEMS AND METHODS FOR PROCESSING OBJECTS PROVIDED IN VEHICLES

(71) Applicant: Berkshire Grey, Inc., Lexington, MA (US)

(72) Inventors: Thomas Wagner, Concord, MA (US); Kevin Ahearn, Fort Mill, SC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Bedford, MA (US)

( * ) Notice: Subject to any disclaimer, the term of this patent is extended or adjusted under 35 U.S.C. 154(b) by 0 days.

(21) Appl. No.: 16/776,197

(22) Filed: Jan. 29, 2020

(65) Prior Publication Data

US 2020/0165074 A1 May 28, 2020

Related U.S. Application Data

(63) Continuation of application No. 15/835,764, filed on Dec. 8, 2017, now Pat. No. 10,618,745.
(Continued)

(51) Int. Cl.
*B65G 47/49* (2006.01)
*B65G 65/06* (2006.01)
(Continued)

(52) U.S. Cl.
CPC .......... *B65G 47/493* (2013.01); *B65G 47/12* (2013.01); *B65G 65/06* (2013.01); *B65G 65/08* (2013.01);
(Continued)

(58) Field of Classification Search
CPC combination set(s) only.
See application file for complete search history.

(56) References Cited

U.S. PATENT DOCUMENTS 3,734,286 A   5/1973   Simjian
4,186,836 A   2/1980   Wassmer et al.
(Continued)

FOREIGN PATENT DOCUMENTS

AU   2006204622 A1   3/2007
CA      2985166 A1  12/2016
(Continued)

OTHER PUBLICATIONS

Non-Final Office Action issued in related U.S. Appl. No. 15/835,764 dated Nov. 20, 2018, 14 pages.
(Continued)

*Primary Examiner* — Kyle O Logan
(74) *Attorney, Agent, or Firm* — Gesmer Updegrove LLP

(57) ABSTRACT

An object processing system is disclosed for unloading objects from a trailer of a tractor trailer. The object processing system includes an engagement system including a truck entry portion for entering the trailer and for indiscriminately engaging unidentified objects within the trailer, and a con-
(Continued)

veyance system for conveying objects engaged by the engagement system toward an unloading portion of the trailer.

27 Claims, 30 Drawing Sheets

Related U.S. Application Data

(60) Provisional application No. 62/432,021, filed on Dec. 9, 2016.

(51) Int. Cl.
*B65G 67/24* (2006.01)
*B65G 47/12* (2006.01)
*B65G 65/08* (2006.01)
*B65G 67/02* (2006.01)

(52) U.S. Cl.
CPC ............. *B65G 67/02* (2013.01); *B65G 67/24* (2013.01); *B65G 2201/0285* (2013.01)

(56) References Cited

U.S. PATENT DOCUMENTS

| | | | |
|---|---|---|---|
| 4,253,791 A * | 3/1981 | Van Drie | B65F 3/24 198/728 |
| 4,557,659 A | 12/1985 | Scaglia | |
| 4,722,653 A | 2/1988 | Williams et al. | |
| 4,759,439 A | 7/1988 | Hartlepp | |
| 4,846,335 A | 7/1989 | Hartlepp | |
| 5,460,271 A | 10/1995 | Kenny et al. | |
| 5,595,263 A | 1/1997 | Pignataro | |
| 5,764,013 A | 6/1998 | Yae | |
| 5,839,566 A | 11/1998 | Bonnet | |
| 6,011,998 A | 1/2000 | Lichti et al. | |
| 6,059,092 A | 5/2000 | Jerue et al. | |
| 6,076,023 A | 6/2000 | Sato | |
| 6,401,936 B1 | 6/2002 | Isaacs et al. | |
| 6,579,053 B1 | 6/2003 | Grams et al. | |
| 6,721,444 B1 | 4/2004 | Gu et al. | |
| 7,313,464 B1 | 12/2007 | Perreault et al. | |
| 7,474,939 B2 | 1/2009 | Oda et al. | |
| 7,516,848 B1 | 4/2009 | Shakes et al. | |
| 7,861,844 B2 | 1/2011 | Hayduchok et al. | |
| 8,662,314 B2 | 3/2014 | Jones et al. | |
| 8,718,814 B1 | 5/2014 | Clark et al. | |
| 8,874,270 B2 | 10/2014 | Ando | |
| 8,952,284 B1 | 2/2015 | Wong et al. | |
| 8,972,045 B1 | 3/2015 | Mountz et al. | |
| 9,061,868 B1 | 6/2015 | Paulsen et al. | |
| 9,120,622 B1 | 9/2015 | Elazary et al. | |
| 9,227,323 B1 | 1/2016 | Konolige et al. | |
| 9,259,844 B2 | 2/2016 | Xu et al. | |
| 9,283,680 B2 | 3/2016 | Yasuda et al. | |
| 9,457,970 B1 | 10/2016 | Zevenbergen et al. | |
| 9,486,926 B2 | 11/2016 | Kawano | |
| 9,492,923 B2 | 11/2016 | Wellman et al. | |
| 9,520,012 B2 | 12/2016 | Stiernagle | |
| 9,604,363 B2 | 3/2017 | Ban | |
| 9,744,669 B2 | 8/2017 | Wicks et al. | |
| 2002/0134056 A1 | 9/2002 | Dimario et al. | |
| 2002/0179502 A1 | 12/2002 | Cerutti et al. | |
| 2003/0042112 A1 | 3/2003 | Woerner et al. | |
| 2004/0112719 A1* | 6/2004 | Gilmore | B65G 21/14 198/812 |
| 2004/0144618 A1 | 7/2004 | McDonald et al. | |
| 2005/0002772 A1 | 1/2005 | Stone | |
| 2006/0242785 A1 | 11/2006 | Cawley et al. | |
| 2008/0181753 A1 | 7/2008 | Bastian et al. | |
| 2010/0125361 A1 | 5/2010 | Mougin et al. | |
| 2010/0180711 A1 | 7/2010 | Kilibarda et al. | |
| 2010/0217528 A1 | 8/2010 | Sato et al. | |
| 2010/0241260 A1 | 9/2010 | Kilibarda et al. | |
| 2011/0144798 A1 | 6/2011 | Freudelsperger | |
| 2012/0118699 A1 | 5/2012 | Buchmann et al. | |
| 2013/0343640 A1 | 12/2013 | Buehler et al. | |
| 2014/0005831 A1 | 1/2014 | Naderer et al. | |
| 2014/0067121 A1 | 3/2014 | Brooks et al. | |
| 2014/0067127 A1 | 3/2014 | Gotou | |
| 2014/0244026 A1 | 8/2014 | Neiser | |
| 2014/0277693 A1 | 9/2014 | Naylor | |
| 2014/0291112 A1 | 10/2014 | Lyon et al. | |
| 2014/0360924 A1 | 12/2014 | Smith et al. | |
| 2014/0364998 A1 | 12/2014 | Neiser et al. | |
| 2015/0057793 A1 | 2/2015 | Kawano | |
| 2015/0073589 A1 | 3/2015 | Kohdl et al. | |
| 2015/0098775 A1 | 4/2015 | Razumov | |
| 2015/0224650 A1 | 8/2015 | Xu et al. | |
| 2015/0306634 A1 | 10/2015 | Maeda et al. | |
| 2015/0352721 A1 | 12/2015 | Wicks et al. | |
| 2015/0360882 A1* | 12/2015 | Girtman | B25J 11/00 700/213 |
| 2015/0369618 A1 | 12/2015 | Barnard et al. | |
| 2015/0375398 A1 | 12/2015 | Penn et al. | |
| 2015/0375880 A1 | 12/2015 | Ford et al. | |
| 2016/0027093 A1 | 1/2016 | Crebier | |
| 2016/0075521 A1 | 3/2016 | Puchwein et al. | |
| 2016/0096694 A1 | 4/2016 | Baylor et al. | |
| 2016/0136816 A1 | 5/2016 | Pistorino | |
| 2016/0199884 A1 | 7/2016 | Lykkegaard et al. | |
| 2016/0221187 A1 | 8/2016 | Bradski et al. | |
| 2016/0221762 A1* | 8/2016 | Schroader | B65G 43/08 |
| 2016/0221766 A1* | 8/2016 | Schroader | B65G 43/08 |
| 2016/0243704 A1 | 8/2016 | Vakanski et al. | |
| 2016/0244262 A1 | 8/2016 | O'Brien et al. | |
| 2016/0264366 A1 | 9/2016 | Heitplatz | |
| 2016/0280477 A1 | 9/2016 | Pippin | |
| 2017/0021499 A1 | 1/2017 | Wellman et al. | |
| 2017/0043953 A1 | 2/2017 | Battles et al. | |
| 2017/0050315 A1 | 2/2017 | Henry et al. | |
| 2017/0057091 A1 | 3/2017 | Wagner et al. | |
| 2017/0066597 A1 | 3/2017 | Hiroi | |
| 2017/0080566 A1 | 3/2017 | Stubbs et al. | |
| 2017/0106532 A1 | 4/2017 | Wellman et al. | |
| 2017/0157648 A1 | 6/2017 | Wagner et al. | |
| 2017/0305694 A1* | 10/2017 | McMurrough | G06T 7/00 |
| 2017/0349385 A1 | 12/2017 | Moroni et al. | |
| 2018/0134501 A1 | 5/2018 | Ge et al. | |

FOREIGN PATENT DOCUMENTS

| | | |
|---|---|---|
| CN | 104743367 A | 7/2015 |
| CN | 105905019 A | 8/2016 |
| CN | 205500186 U | 8/2016 |
| DE | 19510392 A1 | 9/1996 |
| DE | 102004001181 A1 | 8/2005 |
| DE | 102007023909 A1 | 11/2008 |
| DE | 102010033115 A1 | 2/2012 |
| DE | 102011083095 A1 | 3/2013 |
| EP | 0235488 A1 | 9/1987 |
| EP | 0613841 A1 | 9/1994 |
| EP | 0767113 A2 | 4/1997 |
| EP | 1223129 A1 | 7/2002 |
| EP | 1695927 A2 | 8/2006 |
| EP | 1995192 A2 | 11/2008 |
| EP | 2055654 A1 | 5/2009 |
| EP | 2650237 A1 | 10/2013 |
| EP | 2745982 A2 | 6/2014 |
| EP | 2937299 A1 | 10/2015 |
| EP | 3006379 A2 | 4/2016 |
| EP | 3112295 A1 | 1/2017 |
| FR | 1457450 A | 1/1966 |
| FR | 2832654 A1 | 5/2003 |
| GB | 2084531 A | 4/1982 |
| GB | 2507707 A | 5/2014 |
| JP | S54131278 A | 10/1979 |
| JP | S3310406 A | 12/1982 |
| JP | H0395001 A | 4/1991 |
| JP | H08157016 A | 6/1996 |
| JP | H05324662 B2 | 10/2001 |
| JP | 2002028577 A | 1/2002 |
| JP | 2003150230 A | 5/2003 |

(56) References Cited

FOREIGN PATENT DOCUMENTS

| JP | 2007182286 A | 7/2007 |
|---|---|---|
| JP | 2008080300 A | 4/2008 |
| JP | 2010202291 A | 9/2010 |
| JP | 2014141313 A | 8/2014 |
| WO | 03095339 A1 | 11/2003 |
| WO | 2007009136 A1 | 1/2007 |
| WO | 2010017872 A1 | 2/2010 |
| WO | 2010034044 A1 | 4/2010 |
| WO | 2011038442 A2 | 4/2011 |
| WO | 2011128384 A1 | 10/2011 |
| WO | 2012024714 A2 | 3/2012 |
| WO | 2012127102 A9 | 9/2012 |
| WO | 2014064592 A2 | 5/2014 |
| WO | 2014111483 A1 | 7/2014 |
| WO | 2015035300 A1 | 3/2015 |
| WO | 2015118171 A1 | 8/2015 |
| WO | 2015162390 A1 | 10/2015 |
| WO | 2016198565 A1 | 12/2016 |

OTHER PUBLICATIONS

Final Office Action issued by the U.S. Patent and Trademark Office in related U.S. Appl. No. 15/835,764 dated Jun. 11, 2019, 12 pages.
Non-Final Office Action issued by the U.S. Patent and Trademark Office in related U.S. Appl. No. 15/835,764 dated Sep. 16, 2019, 8 pages.
International Preliminary Report on Patentability issued by the International Searching Authority, the European Patent Office, in related International Patent Application PCT/US2017/065264 dated Jun. 11, 2019, 9 pgs.
Cipolla etal., "Visually Guided Grasping in Unstructured Environments," Journal of Robotics and Autonomous Systems, vol. 19, No. 3-4, Mar. 1, 1997, pp. 337-346.
Klingbeil et al., "Grasping withApplication to an Autonomous Checkout Robot," Journal of Robotics and Automation (ICRA), 2011 IEEE, May 9, 2011, pp. 2837-2844.
Communication pursuant to Rules 161(1) and 162 EPC issued by the European Patent Office dated Jul. 16, 2019 in related European Patent Application No. 17826628.4, 3 pages.
International Search Report and Written Opinion issued by the International Searching Authority, the European Patent Office, in related International Patent Application PCT/US2017/065264 dated Mar. 19, 2018, 14 pgs.
Examiner's Report issued by the Innovation, Sciences and Economic Development Canada in related Canadian Patent Application No. 3,046,214 dated May 25, 2020, 4 pages.
First Office Action, along with its English translation, issued by the National Intellectual Property Administration, P.R.C. in related Chinese Patent Application No. 201780075644.9 dated May 20, 2020, 11 pages.
Second Office Action, along with its English translation, issued by the National Intellectual Property Administration, P.R.C in related Chinese Patent Application No. 201780075644.9 dated Jan. 6, 2021, 26 pages.
Canadian Patent Application No. 3,046,214 dated Jan. 12, 2021, 4 pages.

* cited by examiner

SYSTEMS AND METHODS FOR PROCESSING OBJECTS PROVIDED IN VEHICLES

PRIORITY

The present application claims priority to U.S. patent application Ser. No. 15/835,764 filed Dec. 8, 2017, which claims the benefit of U.S. Provisional Patent Application Ser. No. 62/432,021, filed Dec. 9, 2016, the disclosures of which are hereby incorporated by reference in their entireties.

BACKGROUND

The invention generally relates to automated, robotic and other object processing systems such as sortation systems, and relates in particular to automated and robotic systems intended for use in environments requiring, for example, that a variety of objects (e.g., parcels, packages, and articles etc.) be processed and distributed to several output destinations.

Many parcel distribution systems receive parcels from a vehicle, such as a trailer of a tractor trailer. The parcels are unloaded and delivered to a processing station in a disorganized stream that may be provided as individual parcels or parcels aggregated in groups such as in bags, and may be provided to any of several different conveyances, such as a conveyor, a pallet, a Gaylord, or a bin. Each parcel must then be distributed to the correct destination container, as determined by identification information associated with the parcel, which is commonly determined by a label printed on the parcel or on a sticker applied to the parcel. The destination container may take many forms, such as a bag or a bin.

The sortation of such parcels from the vehicle has traditionally been done, at least in part, by human workers that unload the vehicle, then scan the parcels, e.g., with a hand-held barcode scanner, and then place the parcels at assigned locations. For example many order fulfillment operations achieve high efficiency by employing a process called wave picking. In wave picking, orders are picked from warehouse shelves and placed at locations (e.g., into bins) containing multiple orders that are sorted downstream. At the sorting stage individual articles are identified, and multi-article orders are consolidated, for example into a single bin or shelf location, so that they may be packed and then shipped to customers. The process of sorting these objects has traditionally been done by hand. A human sorter picks an object from an incoming bin, finds a barcode on the object, scans the barcode with a handheld barcode scanner, determines from the scanned barcode the appropriate bin or shelf location for the object, and then places the object in the so-determined bin or shelf location where all objects for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

Other ways of identifying items by code scanning either require manual processing, or require that the code location be controlled or constrained so that a fixed or robot-held code scanner (e.g., barcode scanner) can reliably detect it. Manually operated barcode scanners are generally either fixed or handheld systems. With fixed systems, such as those used at point-of-sale systems, the operator holds the object and places it in front of the scanner so that the barcode faces the scanning device's sensors, and the scanner, which scans continuously, decodes any barcodes that it can detect. If the object is not immediately detected, the person holding the object typically needs to vary the position or rotation of the object in front of the fixed scanner, so as to make the barcode more visible to the scanner. For handheld systems, the person operating the scanner looks for the barcode on the object, and then holds the scanner so that the object's barcode is visible to the scanner, and then presses a button on the handheld scanner to initiate a scan of the barcode.

Additionally, current distribution center sorting systems generally assume an inflexible sequence of operations whereby a disorganized stream of input objects is first singulated by human workers into a single stream of isolated objects presented one at a time to a human worker with a scanner that identifies the object. The objects are then loaded onto a conveyor, and the conveyor then transports the objects to the desired destination, which may be a bin, a chute, a bag or a destination conveyor.

In conventional parcel sortation systems, human workers typically retrieve parcels in an arrival order, and sort each parcel or object into a collection bin based on a set of given heuristics. For instance, all objects of like type might be routed to a collection bin, or all objects in a single customer order might be routed to a particular collection bin, or all objects destined for the same shipping destination, etc. may be routed to a certain collection bin. The human workers or automated systems are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not always most efficient.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Other partially automated sortation systems involve the use of recirculating conveyors and tilt trays, where the tilt trays receive objects by human sortation, and each tilt tray moves past a scanner. Each object is then scanned and moved to a pre-defined location assigned to the object. The tray then tilts to drop the object into the location. Other systems that include tile trays may involve scanning an object (e.g., using a tunnel scanner), dropping the object into a tilt tray, associating the object with the specific tilt tray using a known location or position, for example, using beam breaks, and then causing the tilt tray to drop the object when it is at the desired destination.

Further, partially automated systems, such as the bombbay style recirculating conveyor, involve having trays open doors on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; the trays then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not ID an object and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations to total number of system bins. The system is simply diverting an equal share of the total objects to each parallel manual cell. Thus each parallel sortation cell must have all the same collection bins designations; otherwise an object might be delivered to a cell that does not have a bin to which that object s mapped. There remains a need for a more efficient and more cost effective object sortation system that sorts objects of a variety of sizes and weights into appropriate collection bins or trays of fixed sizes, yet is efficient in handling objects of such varying sizes and weights.

Further, such systems do not adequately account for the overall process in which objects are first delivered to and provided at a processing station by a vehicle such as a trailer of a tractor trailer. Additionally, many processing stations, such as sorting stations for sorting parcels, are at times, at or near full capacity in terms of available floor space and sortation resources.

SUMMARY

In accordance with an embodiment, the invention provides an object processing system for unloading objects from a trailer of a tractor trailer. The object processing system includes an engagement system including a truck entry portion for entering the trailer and for indiscriminately engaging unidentified objects within the trailer, and a conveyance system for conveying objects engaged by the engagement system toward an unloading portion of the trailer.

In accordance with another embodiment, the invention provides an automated method of unloading objects from a trailer of a tractor trailer. The method includes the steps of indiscriminately engaging unidentified objects within the trailer, conveying engaged objects toward an unloading portion of the trailer, and transporting the objects toward a distribution location

BRIEF DESCRIPTION OF THE DRAWINGS

The following description may be further understood with reference to the accompanying drawings in which.

Figure 1:
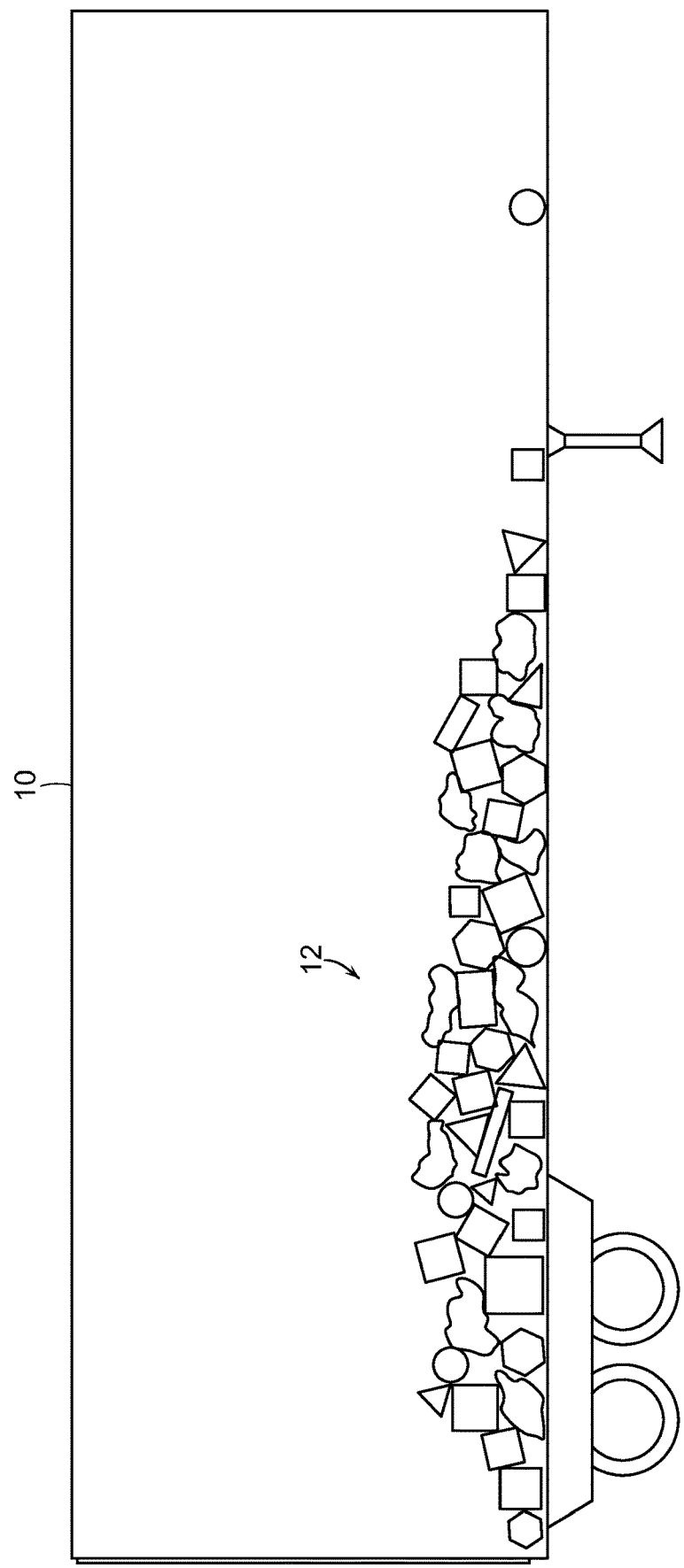
FIG. 1 shows an illustrative diagrammatic view of a trailer of a tracker trailer (with side wall removed) including objects to be processed.

The drawings are shown for illustrative purposes only.

DETAILED DESCRIPTION

In accordance with an embodiment the invention provides an object processing system for unloading objects from a trailer of a tractor trailer. The object processing system include an engagement system including a truck entry portion for entering the trailer and for indiscriminately engaging objects within the trailer, and a conveyance system for conveying objects engaged by the engagement system toward an unloading portion of the trailer. The truck entry portion does not discriminate between objects, and select objects using complex image processing analyses, but rather indiscriminately seeks to gather all objects in its path.

In accordance with a further embodiment, the invention provides a truck trailer unloading system and a processing system within a trailer of another tracker trailer, such that objects may be provided to the processing system, and processed within the other trailer. For example, the second trailer may include an input system for receiving a wide variety of objects to be sorted, a singulation system for providing a singulated stream of objects for efficient processing of the objects, an identification system, and routing system for delivering the objects to desired destinations. Generally, individual parcels need to be identified and conveyed to desired parcel-specific locations. The described systems reliably automate the identification and conveyance of such parcels, employing in certain embodiments, a set of conveyors and sensors and a scanning system. In short, applicants have discovered that when automating the sortation of objects, there are a few main things to consider: 1) the overall system throughput (parcels sorted per hour), 2) the number of diverts (i.e., number of discrete locations to which an object can be routed), 3) the total area of the sortation system (square feet), 4) sort accuracy, and 5) the capital and annual costs to run the system (e.g., man-hours, electrical costs, cost of disposable components).

Sorting objects in a shipping distribution center is one application for automatically identifying and sorting parcels. In a shipping distribution center, parcels commonly arrive in truck trailers, are conveyed to sortation stations where they are sorted according to desired destinations, aggregated in bags, and then loaded back in truck trailers for transport to the desired destinations. Other applications may include the shipping department of a retail store or order fulfillment center, which may require that parcels be sorted for transport to different shippers, or to different distribution centers of a particular shipper. In a shipping or distribution center, the parcels may take form of plastic bags, boxes, tubes, envelopes, or any other suitable container, and in some cases may also include objects not in a container. In a shipping or distribution center the desired destination is commonly obtained by reading identifying information printed on the parcel or on an attached label. In this scenario the destination corresponding to identifying information is commonly obtained by querying the customer's information system. In other scenarios the destination may be written directly on the parcel, or may be known through other means.

FIG. 1 shows a trailer of a tracker trailer (with a side removed), wherein a trailer 10 of a tractor trailer may contain a wide variety of objects 12, which may become jostled and shaken while being transported in the trailer 10. Typically, the objects 12 are removed from the trailer by hand by human personnel that walk into the trailer and hand carry the objects out from the trailer or place the objects into a bin or carrier by which the objects may be moved to a sortation or other processing station.

Figure 2:
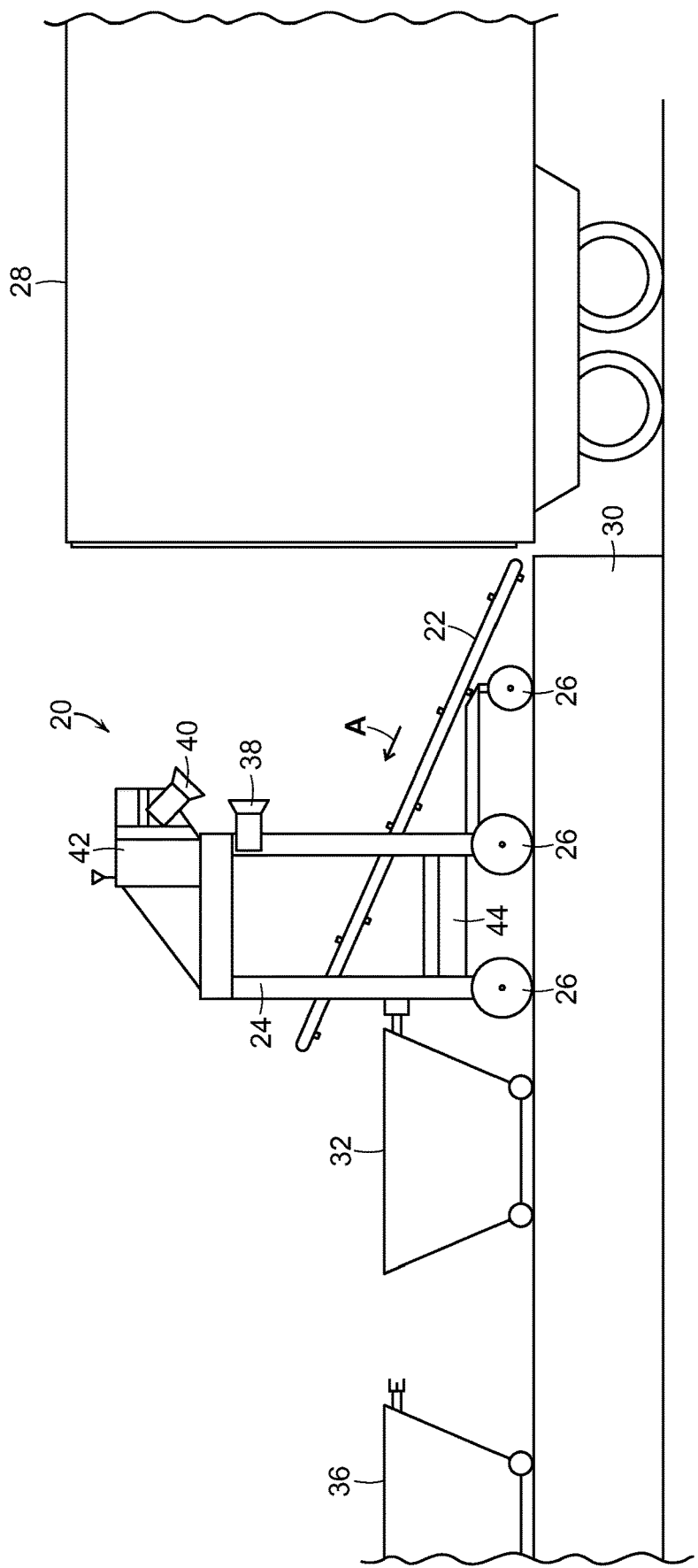
FIG. 2 shows an illustrative diagrammatic side view of system in accordance with an embodiment of the present invention.
Figure 3:
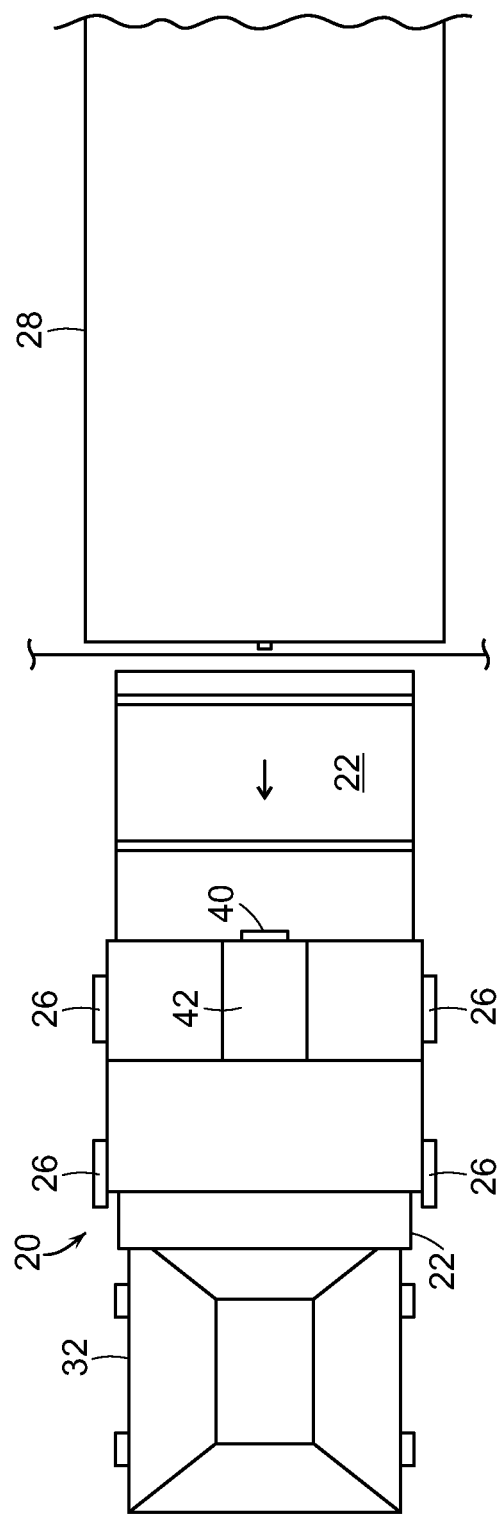
FIG. 3 shows an illustrative diagrammatic top view of the system of FIG. 2.

FIGS. 2 and 3 show an unloading system 20 in accordance with an embodiment of the invention that includes a conveyor 22 that is supported by an unloading structure 24 having wheels 26 such that the conveyor 22 may be directed to enter a trailer 28 off of a loading dock 30. FIG. 2 shows a side view, and FIG. 3 shows a top view. The conveyor 22 may be a cleated conveyor, and as the conveyor moves in the direction generally indicated at A, objects within the trailer (e.g., parcels, packages articles etc.) may be drawn up onto the conveyor 22 and carried to the top of the conveyor 22, whereupon they fall into a wheeled bin 32. The bin 32 may be detachable from the structure 24 by a coupling 34, and additional bins (e.g., 36) may be coupled to the structure when the bin 32 is full. The unloading structure also includes one or more perception devices 38, 40 that may be any of a wide variety of cameras or scanners, as well as a processing system 42 that is in communication with the perception devices and a drive system 44 for moving the structure back and forth within the trailer 28.

Figure 4:
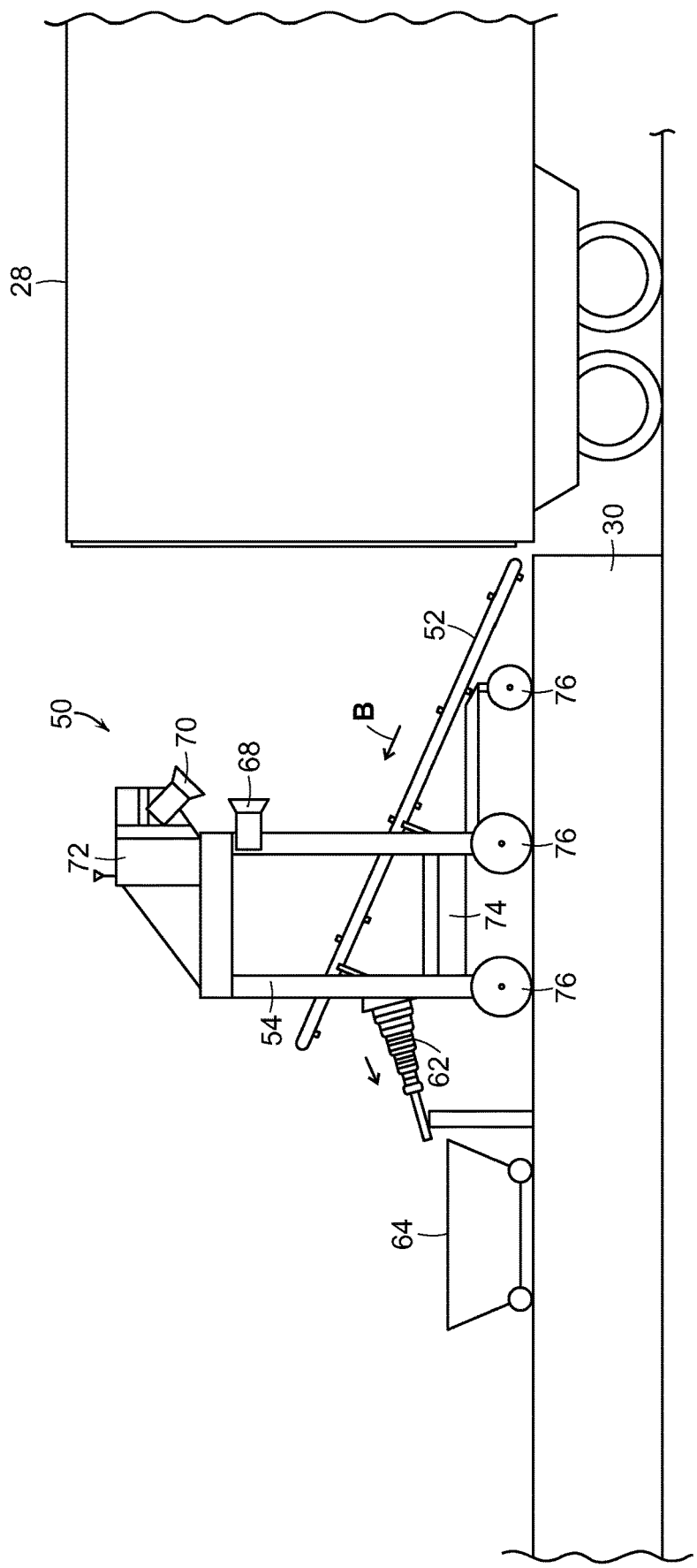
FIG. 4 shows an illustrative diagrammatic side view of a system in accordance with another embodiment of the present invention involving a retractable conveyance.
Figure 5:
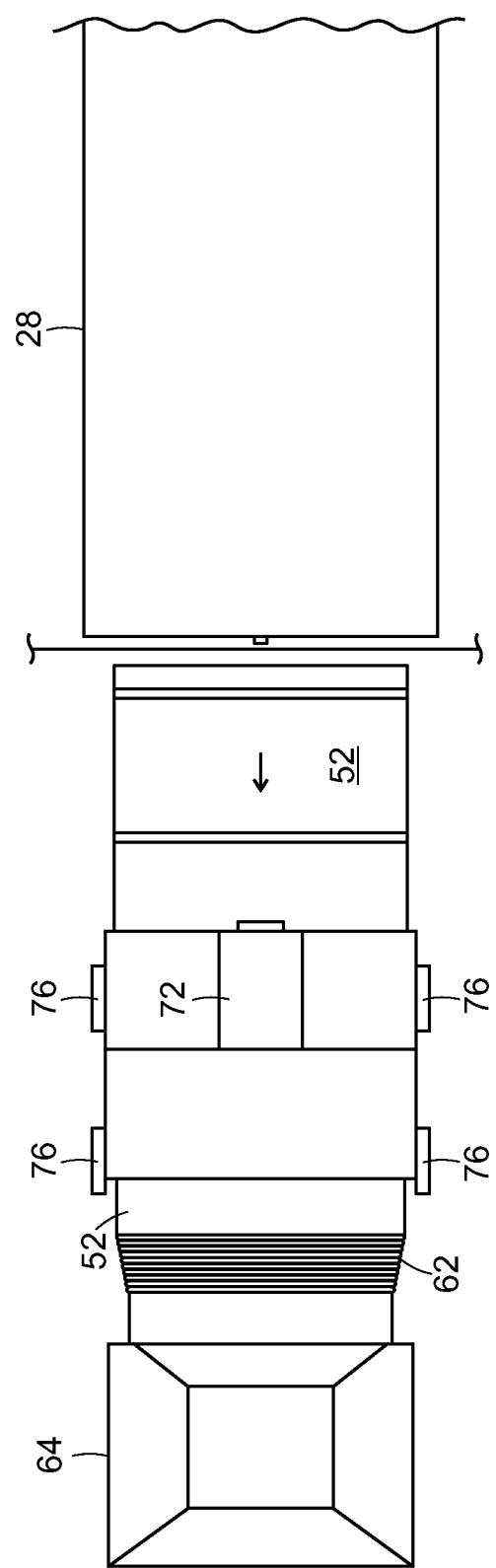
FIG. 5 shows an illustrative diagrammatic top view of the system of FIG. 4.
Figure 6:
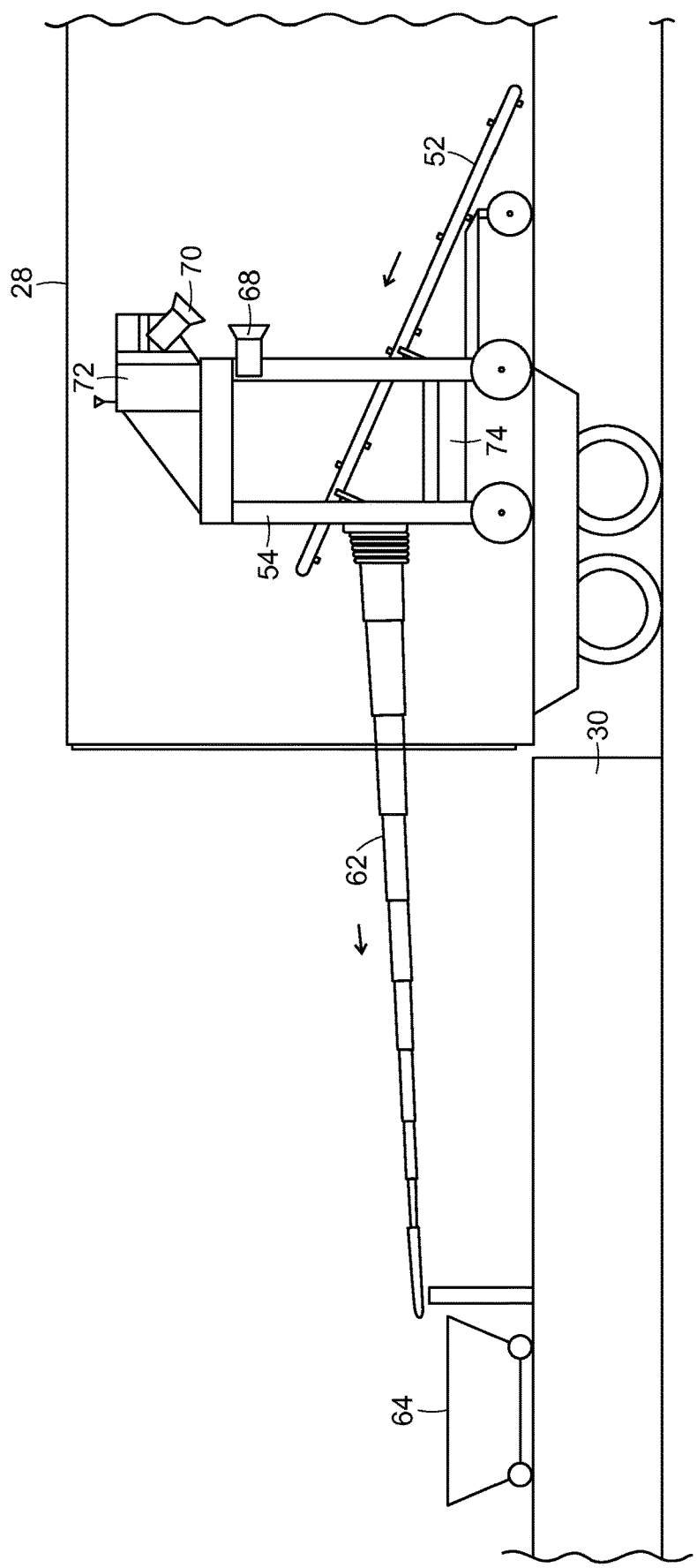
FIG. 6 shows an illustrative diagrammatic side view of the system of FIG. 4 with the retractable conveyance partially extended, and with a side wall of the trailer removed.

FIGS. 4-6 show another embodiment of the present invention that includes an unloading system 50 that includes a conveyor 52 that is supported by an unloading structure 54 having wheels 56 such that the conveyor 52 may be directed to enter the trailer 28 off of the loading dock 30. FIG. 4 shows a side view, FIG. 5 shows a top view, and FIG. 6 shows a side view with the unloading structure within the trailer 28 with a trailer wall removed. The conveyor 52 may be a cleated conveyor, and as the conveyor moves in the direction generally indicated at B, objects within the trailer (e.g., parcels, packages articles etc.) may be drawn up onto the conveyor 52 and carried to the top of the conveyor 52, whereupon they fall into an extendable chute (or extendable conveyor) 62 that leads to a bin 64. As shown in FIG. 6 (with a side wall of the trailer removed), the extendable chute 62 extends as the unloading structure is moved into the trailer 28, and in this embodiment, the bin 64 remains stationary until filled and then replaced. The unloading structure 54 also includes one or more perception devices 68, 70 that may be any of a wide variety of cameras or scanners, as well as a processing system 72 that is in communication with the perception devices and a drive system 74 for moving the structure back and forth within the trailer 28. As noted, in further embodiments, the extendable chute 62 may be an extendable conveyor.

Systems of the embodiments of FIGS. 2-6 may include a wide conveyor (as shown) for engaging the objects within the trailer, and the width may be close to but less than the interior width of the trailer. In accordance with further embodiments, the system may include a conveyor that is wide at the portion of the conveyor that engages objects in the trailer, but that has an effective smaller width (e.g., has narrowing rails) near the top of the conveyor.

Figure 7:
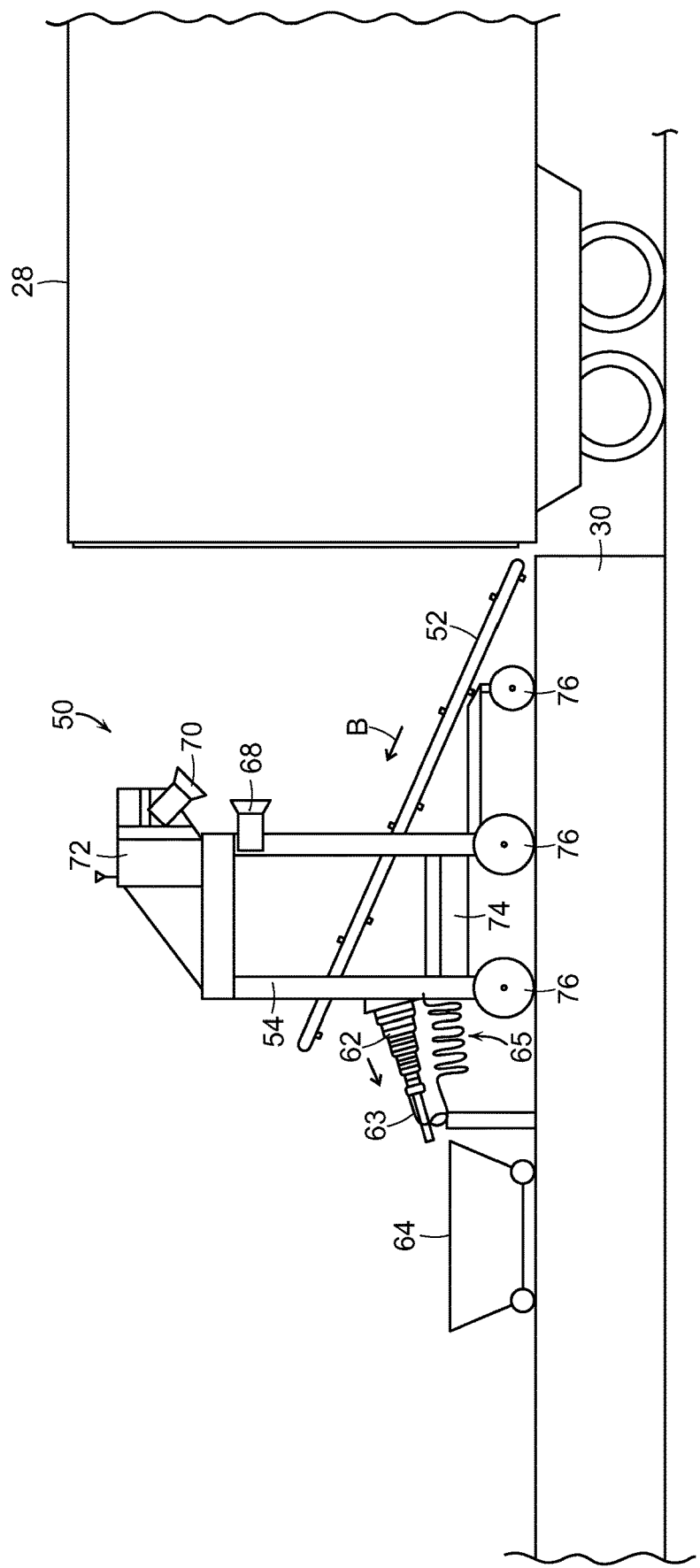
FIG. 7 shows an illustrative diagrammatic side view of a system in accordance with another embodiment of the present invention including a retractable moving conveyor.
Figure 8:
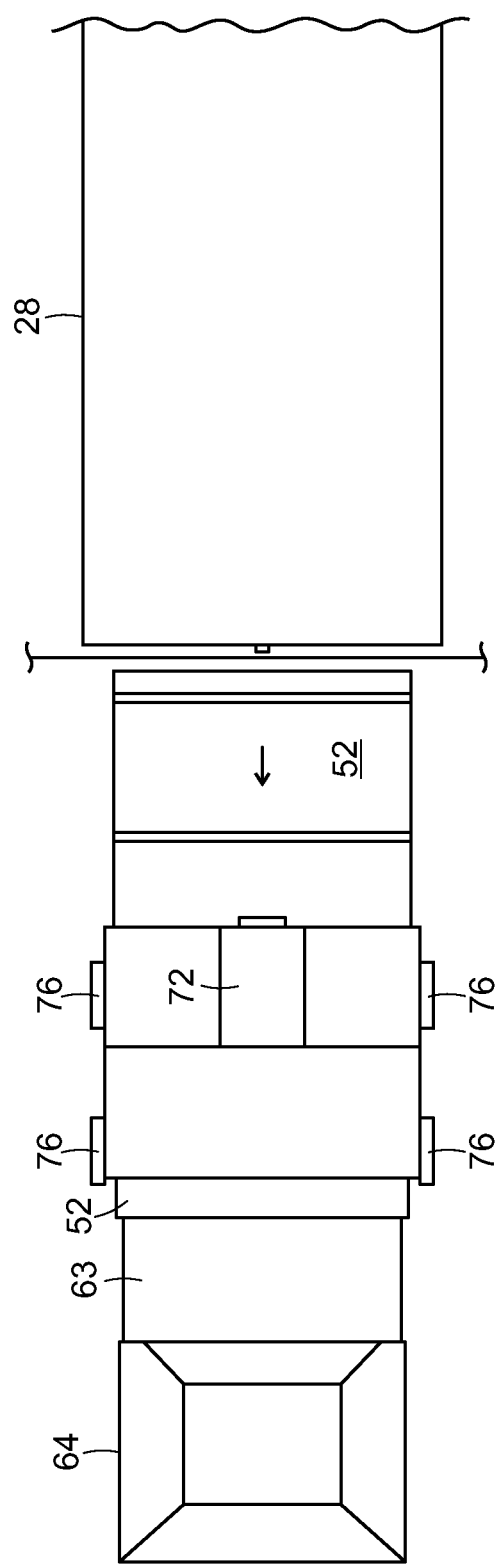
FIG. 8 shows an illustrative diagrammatic top view of the system of FIG. 7.
Figure 9:
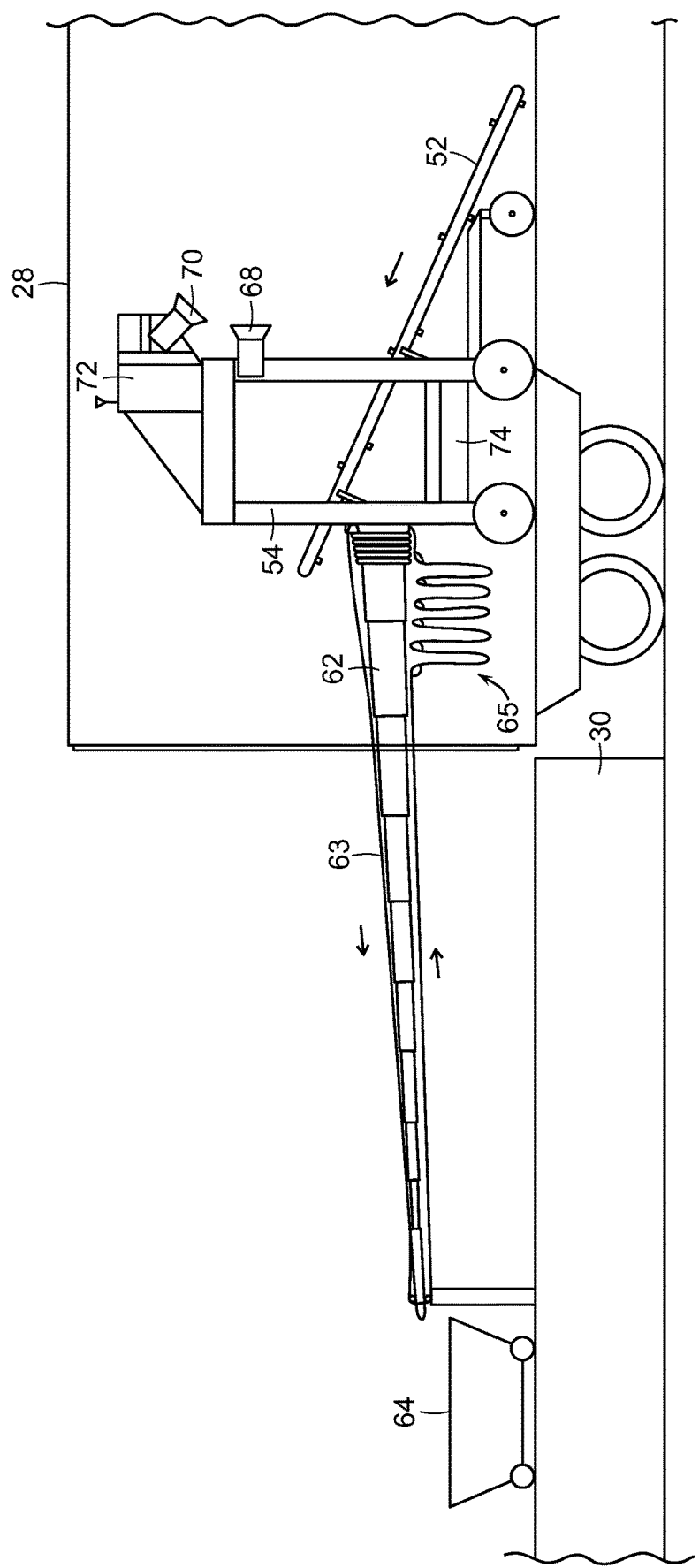
FIG. 9 shows an illustrative diagrammatic side view of the system of FIG. 4 with the retractable moving conveyor partially extended, and with a side wall of the trailer removed.

FIG. 7 shows a side view of a system in accordance with another embodiment of the invention that is similar to the system of FIGS. 4-6, wherein a collapsible conveyor 63 is provided over the extendable chute 62. In particular, the conveyor 63 includes an extendable/collapsible portion 65 that permits the conveyor to extend (as shown in FIG. 9). FIG. 8 shows a top view of the system of FIG. 7.

Figure 10:
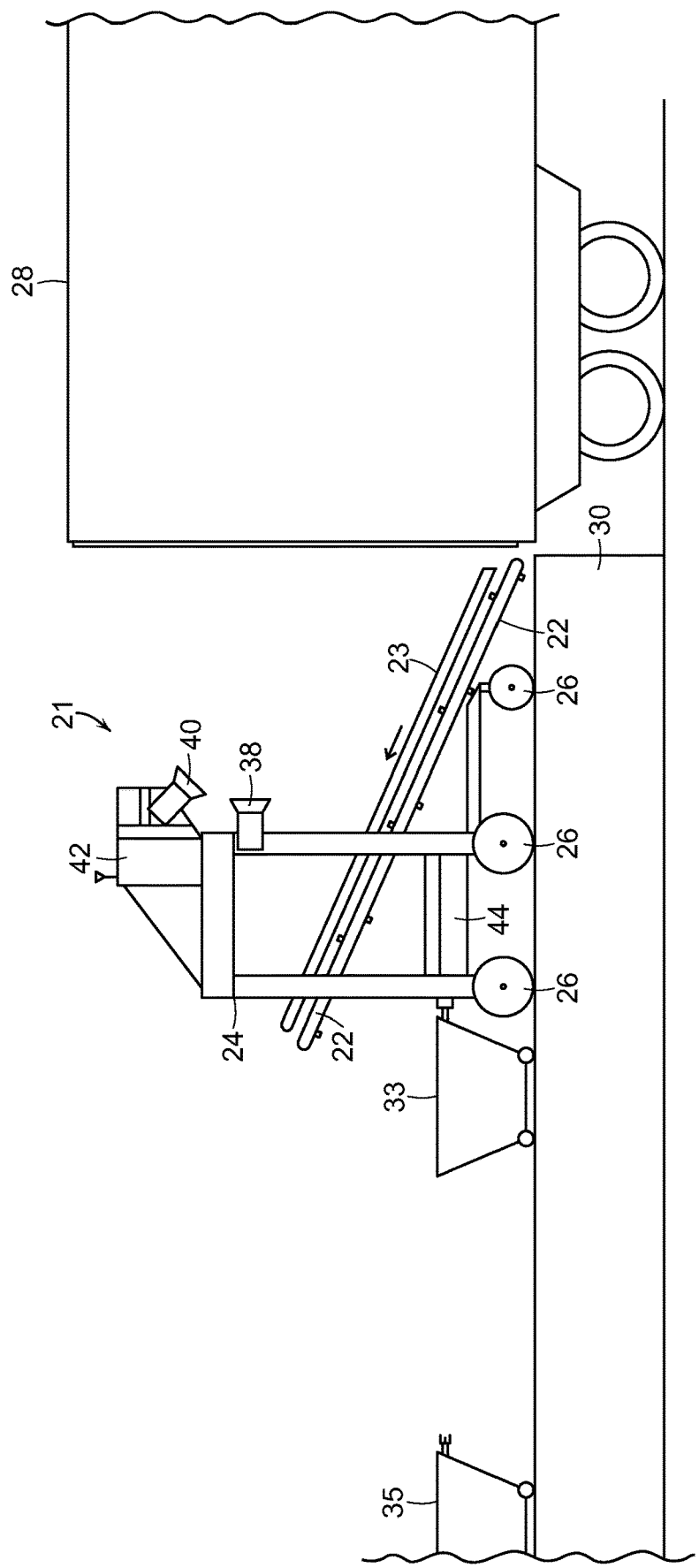
FIG. 10 shows an illustrative diagrammatic side view of a system in accordance with another embodiment of the present invention including guide rails and a wheeled bin.
Figure 11:
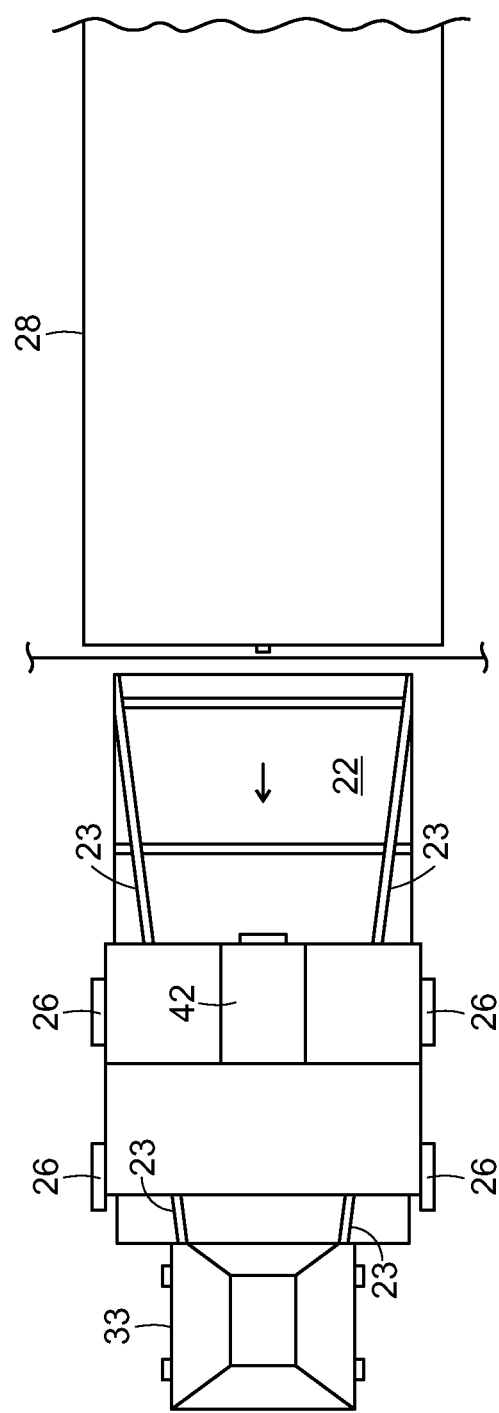
FIG. 11 shows an illustrative diagrammatic top view of the system of FIG. 10.
Figure 12:
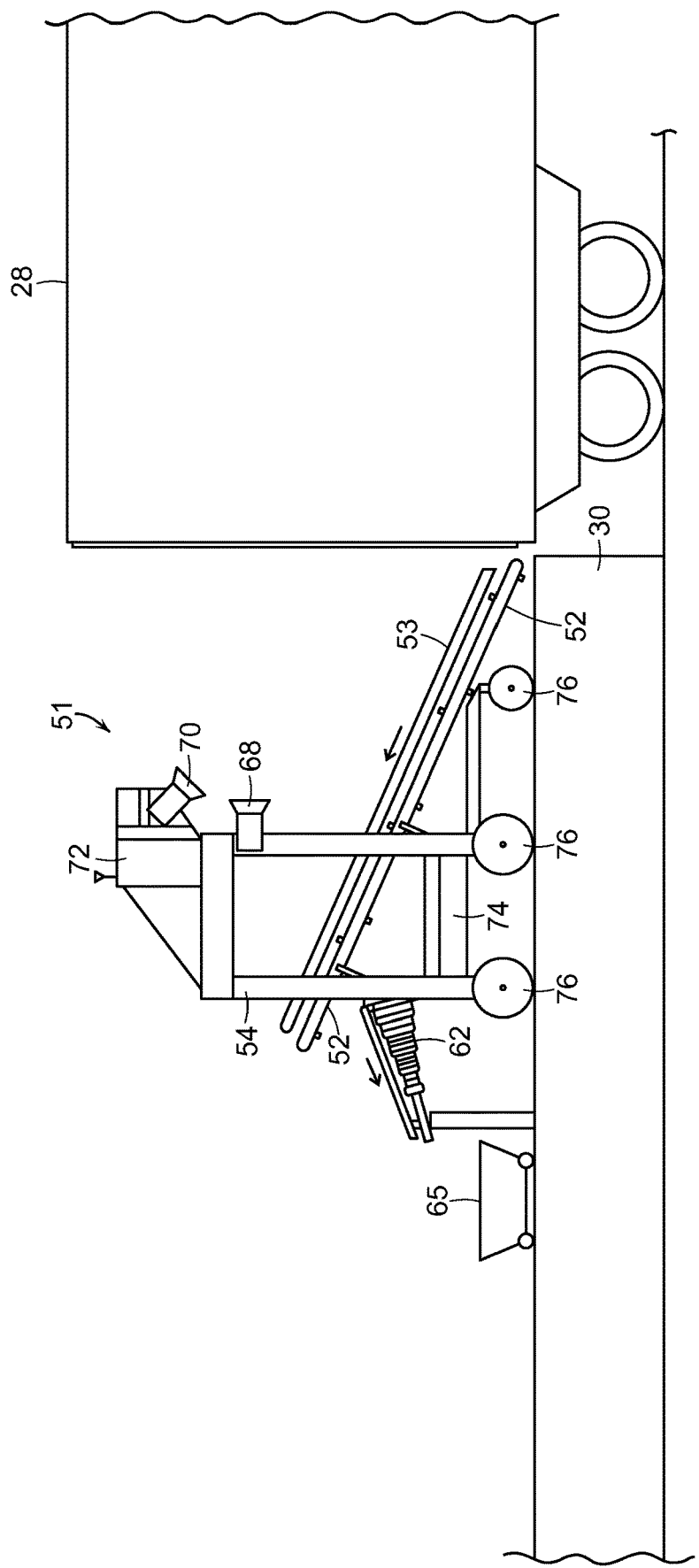
FIG. 12 shows an illustrative diagrammatic side view of a system in accordance with another embodiment of the present invention including guide rails and a retractable conveyance.
Figure 13:
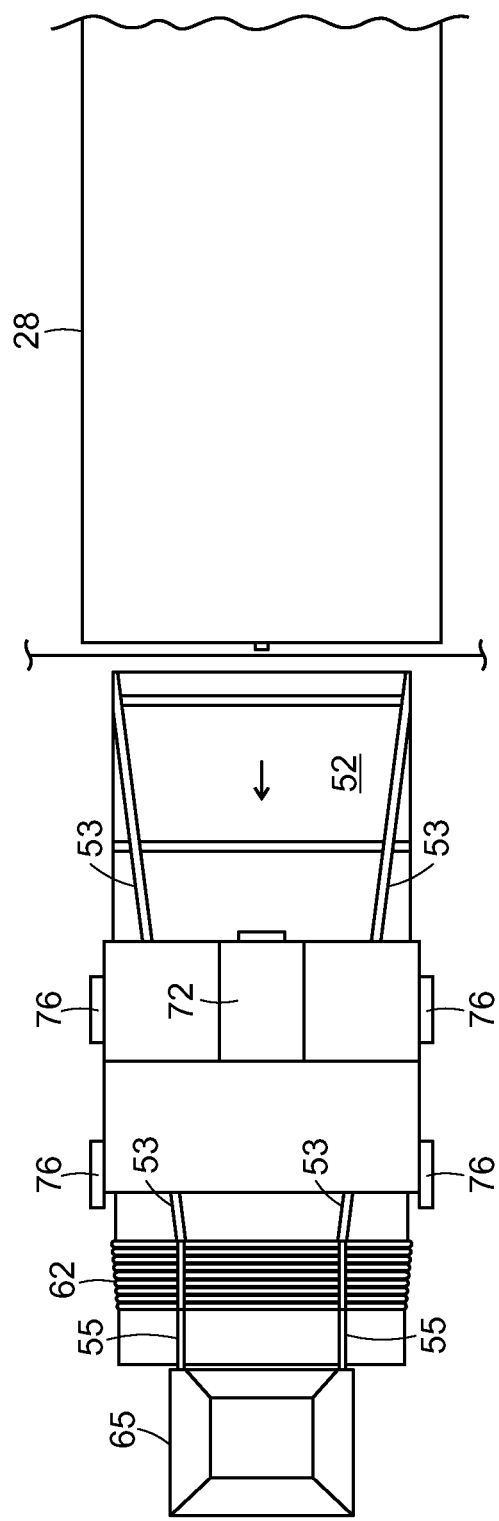
FIG. 13 shows an illustrative diagrammatic top view of the system of FIG. 12.

FIGS. 10 and 11 show an unloading system 21 similar to the unloading system 20 of FIGS. 2 and 3, wherein like reference numerals are used to show the same elements as in the system of FIGS. 2 and 3. The system 21 however, includes guides 23 along the conveyor 22 that urge objects toward the center of the conveyor 22 as the conveyor moves toward the top of the conveyor path. The system 21 also may include smaller collection bins 33. Similarly, FIGS. 12 and 13 show an unloading system 51 similar to the unloading system 50 of FIGS. 4 and 5, wherein like reference numerals are used to show the same elements as in the system of FIGS. 4 and 5. The system 51 however, includes guides 53 along the conveyor 52 (and guides 55 along the extendable chute 62) that urge objects toward the center of the conveyor 52 as the conveyor moves toward the top of the conveyor path. The system 51 also may include smaller collection bins 53.

Figure 14:
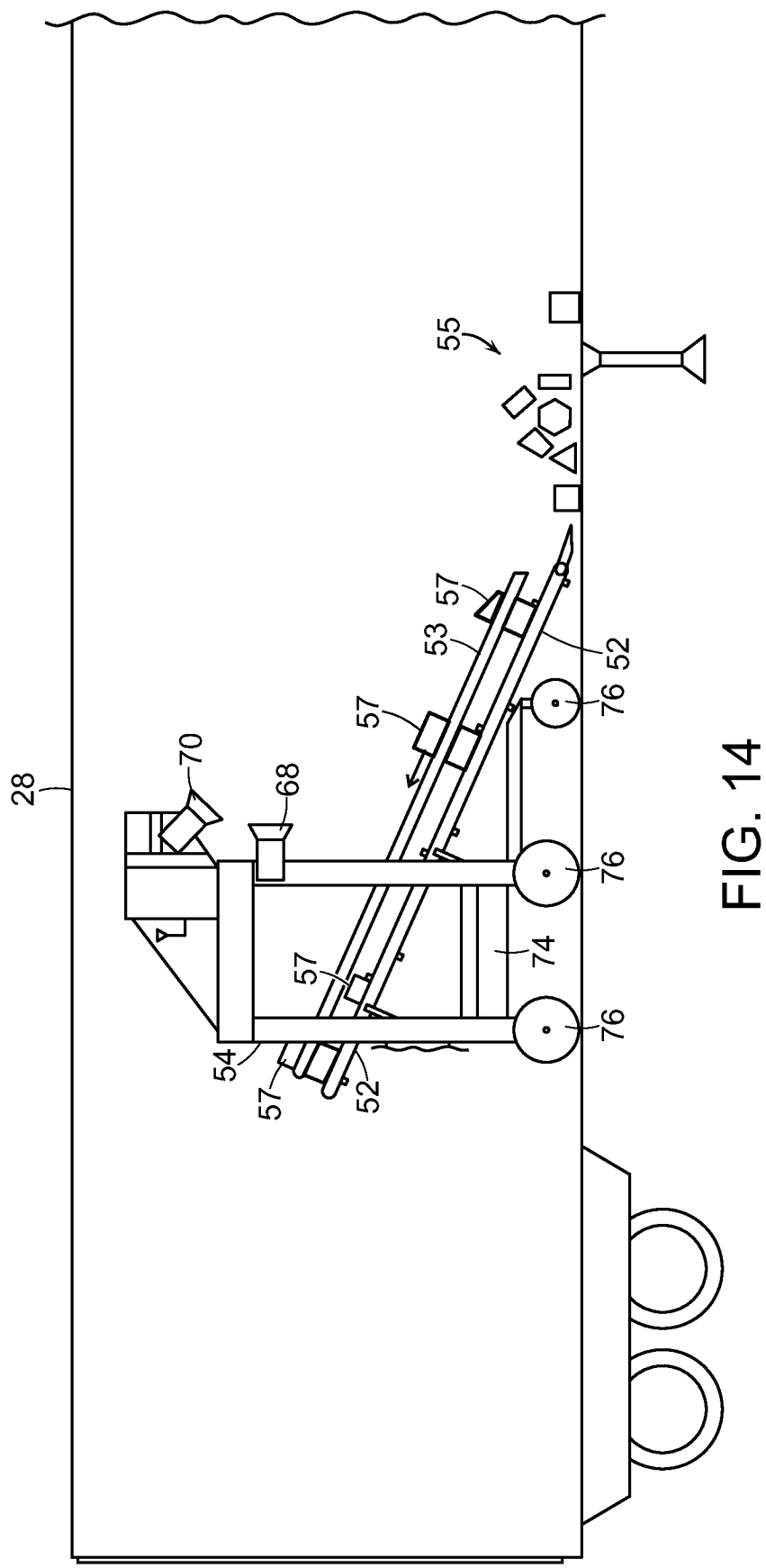
FIG. 14 shows an illustrative diagrammatic side view of an object collection portion of a system in accordance with embodiment of the present invention engaging object within a trailer with a side wall of the trailer removed.
Figure 15:
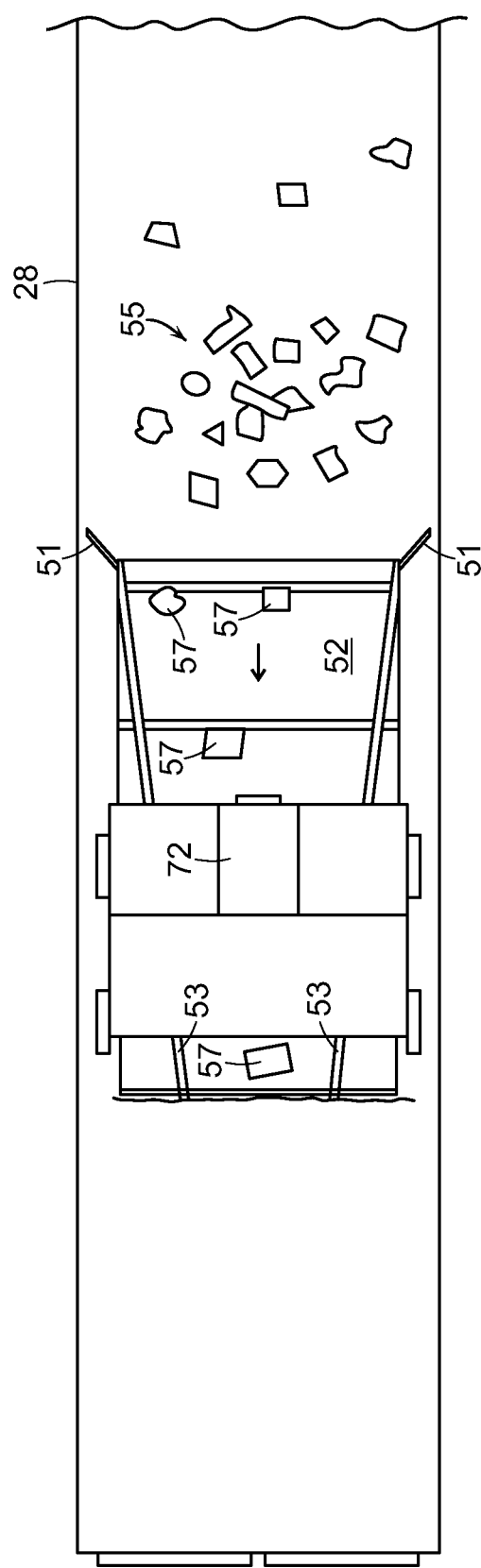
FIG. 15 shows an illustrative diagrammatic top view of the object collection portion of the system of FIG. 14 with the top of the trailer removed.

FIGS. 14 and 15 show side and top views of an unloading system inside a trailer, wherein the object conveyance system may, for example, be that of any of the above embodiments. Objects 55 within the trailer 28 are indiscriminately engaged by the unloading system, and engaged objects 57 are conveyed by the cleated conveyor 52 to any of the above disclosed conveyance systems. The system may also include front guides 51 that urge any objects near the side walls of the trailer toward the center.

Figure 16:
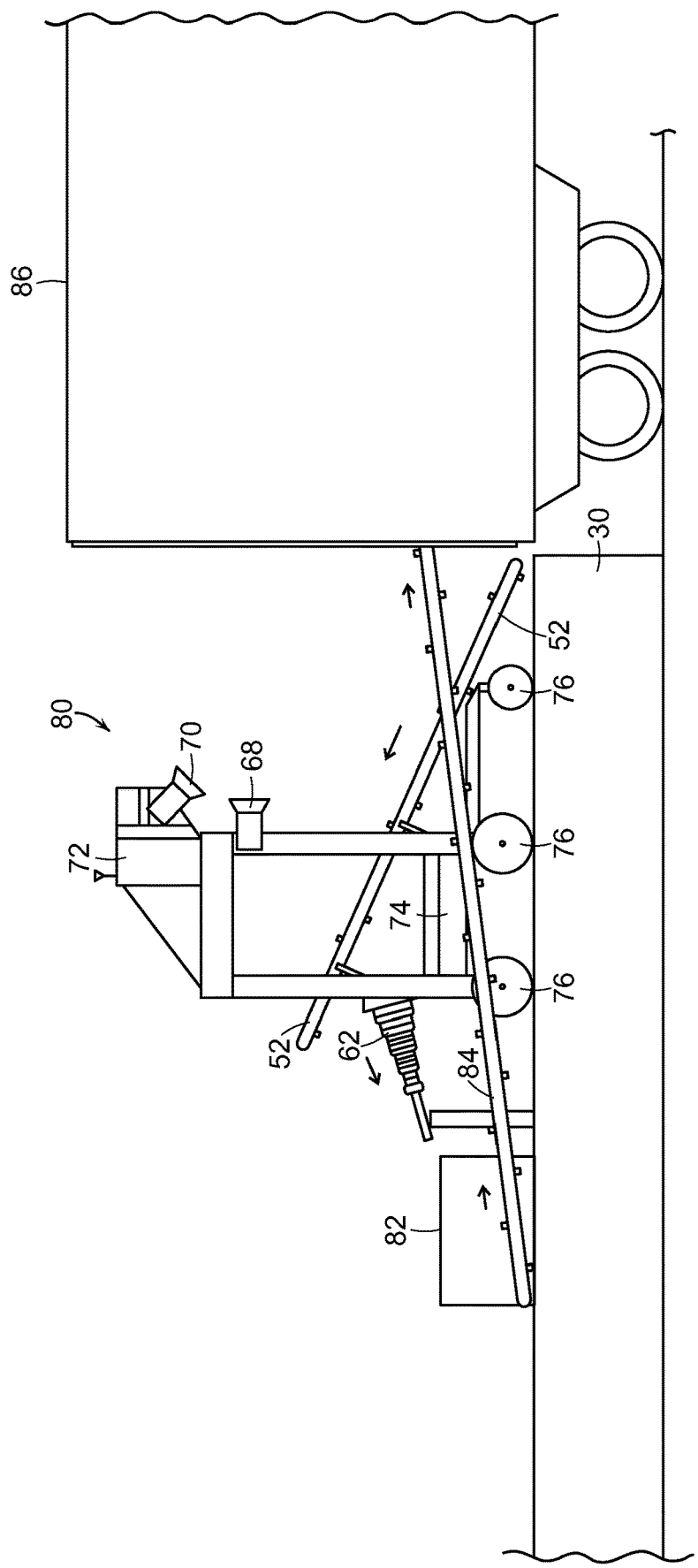
FIG. 16 shows an illustrative diagrammatic side view of a system in accordance with a further embodiment of the present invention that includes conveyance to an object processing system.
Figure 17:
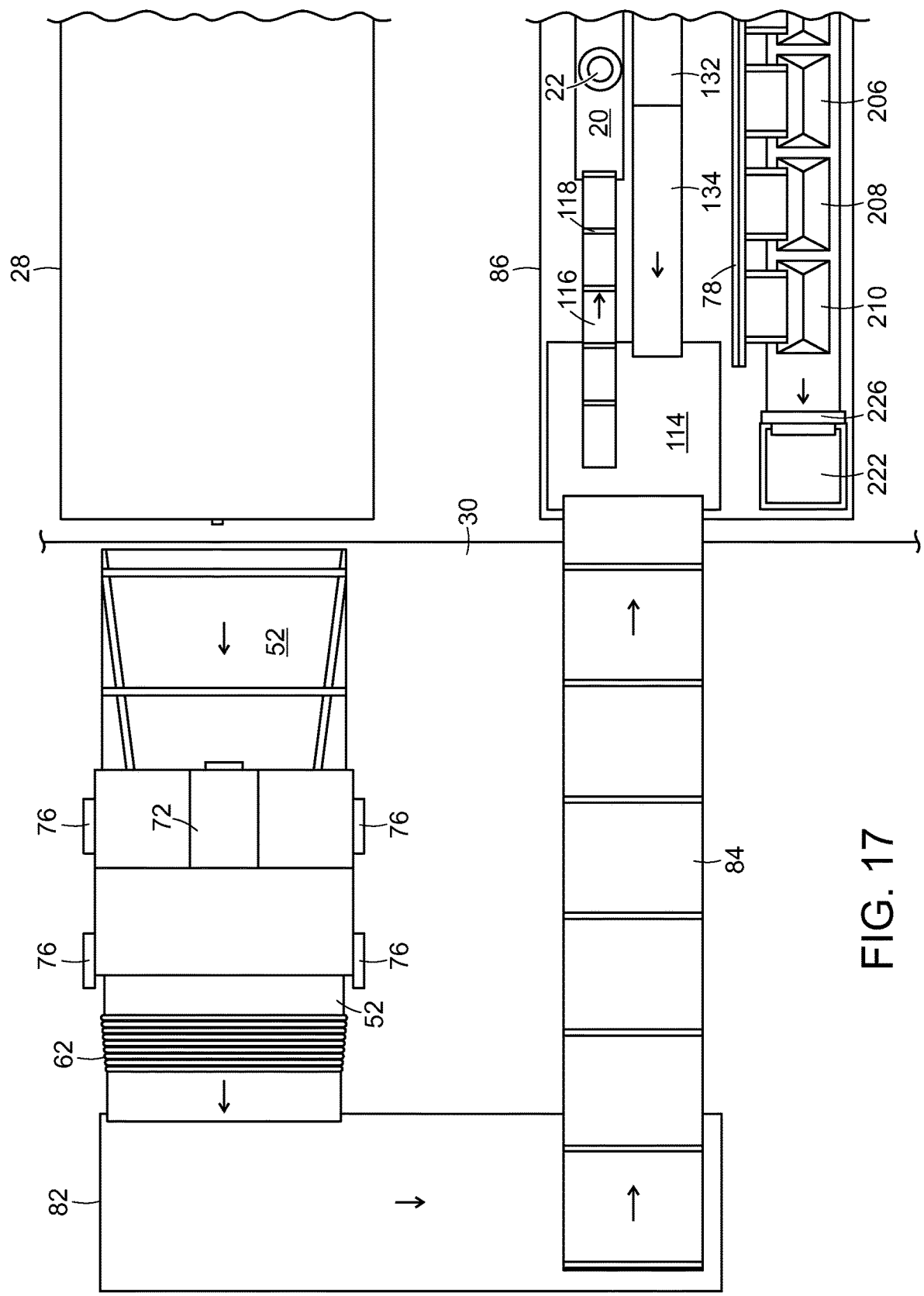
FIG. 17 shows an illustrative diagrammatic top view of the system of FIG. 16.

FIGS. 16 and 17 show an unloading system in accordance with a further embodiment of the invention, except that the extendable chute (or conveyor) 62 leads to a redirecting chute 80. The redirecting chute 80 provides that objects become collected near a sortation in-feed conveyor 82, which provides the objects to a sortation system that is within another trailer 84 that is adjacent the trailer 28. In accordance with various embodiments, therefore, the invention provides a method of taking individual parcels from a disorganized stream of parcels within a trailer, providing them to a sortation station (in another trailer), providing a singulated stream of objects, identifying individual parcels, and sorting them to desired destinations, all within a confined location (e.g., within a trailer of a tracker trailer). The invention further provides methods for conveying parcels from one point to the next, for excluding inappropriate or unidentifiable parcels, for grasping parcels, for determining grasp locations, for determining robot motion trajectories, for transferring parcels from one conveyor to another, for aggregating parcels and transferring to output conveyors, for digital communication within the system and with outside information systems, for communication with human operators and maintenance staff, and for maintaining a safe environment.

Figure 18:
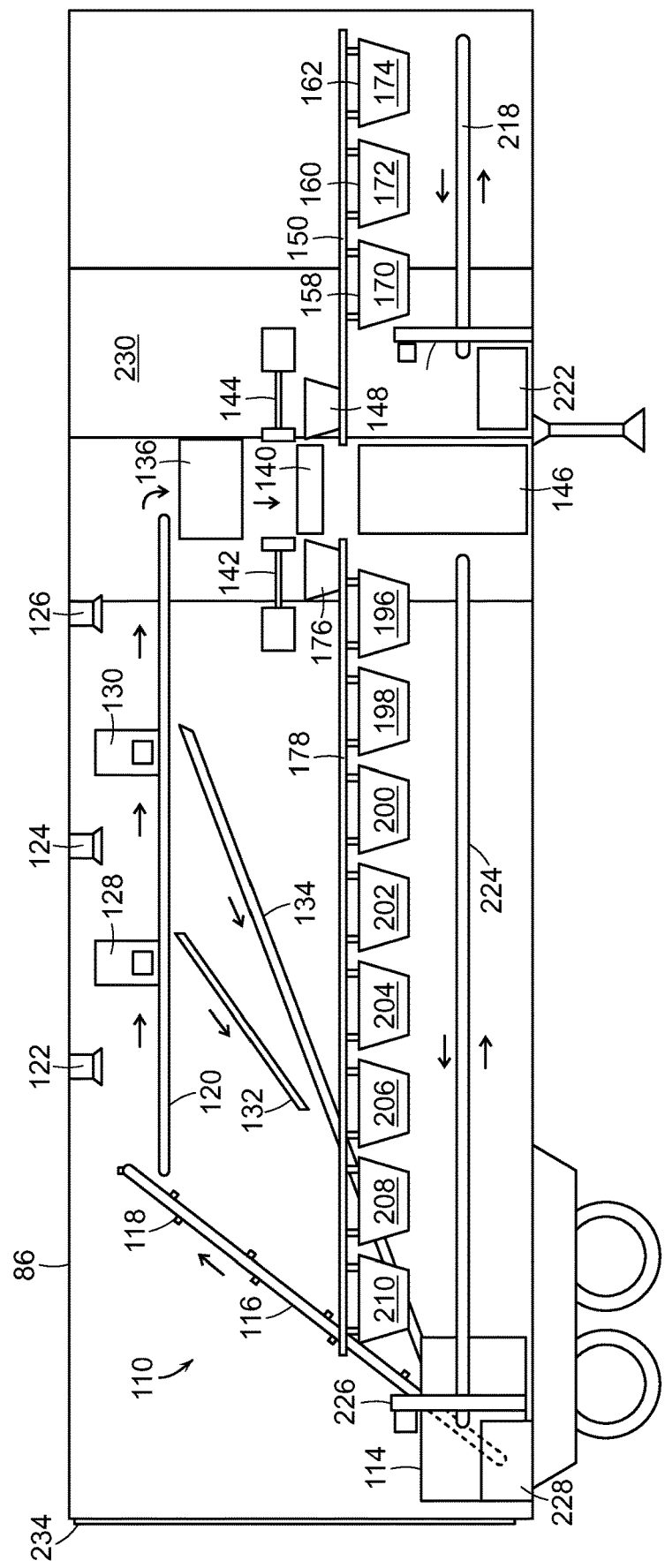
FIG. 18 shows an illustrative diagrammatic side view of an object processing system in accordance with an embodiment of the present invention, with a side wall of a processing trailer removed.
Figure 19:
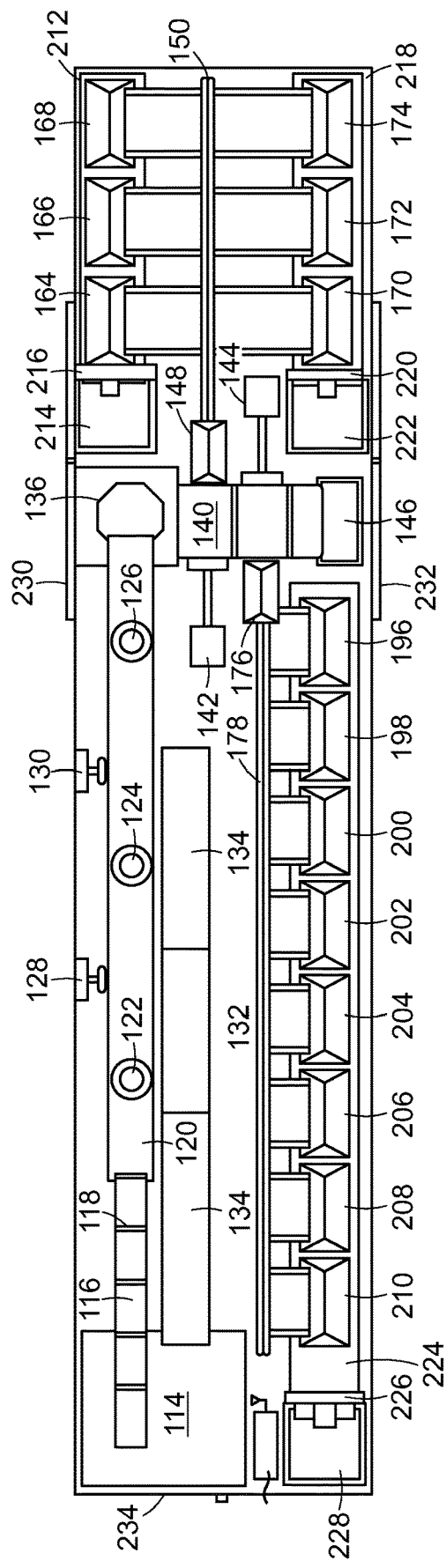
FIG. 19 shows an illustrative diagrammatic top view of the system of FIG. 18 with the top of the trailer removed.

Important components of an automated object identification and processing system, in accordance with an embodiment of the present invention, are shown in FIGS. 18 and 19. FIG. 18 shows a side view of the system 110 within the trailer 84 (with a wall of the trailer removed for clarity), and FIG. 19 shows a top view of the system 110 (with the top of the trailer removed for clarity). The system 110 includes an infeed hopper 114 into which objects may be dumped, e.g., by a dumper or Gaylord. An infeed cleated conveyor 116 conveys objects from the infeed hopper 114 to a primary conveyor 120. The infeed conveyor 116 may include baffles 118 or cleats for assisting in lifting the objects from the hopper 114 onto the primary conveyor 120. A primary perception system may include one or more perception units 122, 124, 126 that survey objects on the conveyor 120, in part, to identify certain objects for returning to the infeed hopper 114 so as to provide a singulated stream of objects. In particular, the system includes one or more diverters 128, 130 that may be selectively engaged to divert certain objects return chutes 132, 134 for returning to the infeed hopper 114. A portion therefore, of the input stream is selectively adjusted by the diverters 128, 130 to provide a singulated stream of objects (as may be detected and confirmed by a perception unit 126).

The singulated stream of objects is delivered to a drop perception unit 136 (as discussed below) as a singulated stream and without requiring that a robotic system place objects into the drop perception unit. By providing a singulated stream of objects for processing, the system is able to more effectively control the object processing rate, and reducing the incidence of errors that may occur, for example of two objects in close contact with each other are perceived as being one object. The infeed conveyor 116 may also be in communication with a controller 138, and speed of the infeed conveyor 116 as well as the speed (and even direction) of the primary conveyor 120 may be adjusted to either slow down if moving too fast, or speed up if system determines that more bandwidth exists for a faster input.

Objects then drop through the drop perception unit 136 and fall onto a secondary conveyor 40, and one or more diverters 142, 144 may be employed to divert each object in a desired direction. If an object on the conveyor 140 is not diverted, then the object will fall into an unsorted collection bin 46. When the diverter 142 is engaged to divert an object off of the conveyor 140, the object falls to a carriage 48 that reciprocally runs along a track 150. The contained object in the carriage 48 may then be selectively dumped onto one of a plurality of chutes 152, 154, 156, 158, 160, 162 toward a respective drop container 164, 166, 168, 170, 172, 174, which each include a bomb-bay style bottom drop floor as will be discussed in more detail below. When the diverter 144 is engaged to divert an object off of the conveyor 140, the object falls to a carriage 176 that reciprocally runs along a track 178. The contained object in the carriage 176 may then be selectively dumped onto one of a plurality of chutes 180, 182, 184, 186, 188, 190, 192, 194 toward a respective drop container 196, 198, 200, 202, 204, 206, 208, 210, which each include a bomb-bay style bottom drop floor.

When any of the drop containers 164, 166, 168 is full or otherwise complete and ready for further processing, the bottom of the ready container is dropped onto a conveyor 212 where the contents are moved toward a destination bin 214. Prior to reaching the destination bin 214 however, the contents are passed through an automatic bagging and labeling device 216 as will be discussed below in more detail. When any of the drop containers 170, 172, 174 is full or otherwise complete and ready for further processing, the bottom of the ready container is dropped onto a conveyor 218 where the contents are moved through an automatic bagging and labeling device 220 toward a destination bin 222. Further, when any of the drop containers 196, 198, 200, 202, 204, 206, 208, 210 is full or otherwise complete and ready for further processing, the contents of the ready container is dropped onto a conveyor 224 where the contents are moved through an automatic bagging and labeling device 226 toward a destination bin 228. The destination bin 114 may be accessed through doors 230 in the trailer, and the destination bins 220 (as well as the unsorted collection bin 146) may be accessed through doors 232 in the trailer. The destination bin 228 (as well as the input hopper 114 and the controller 138) may be accessed through doors 234 at the rear of the trailer.

Figure 20:
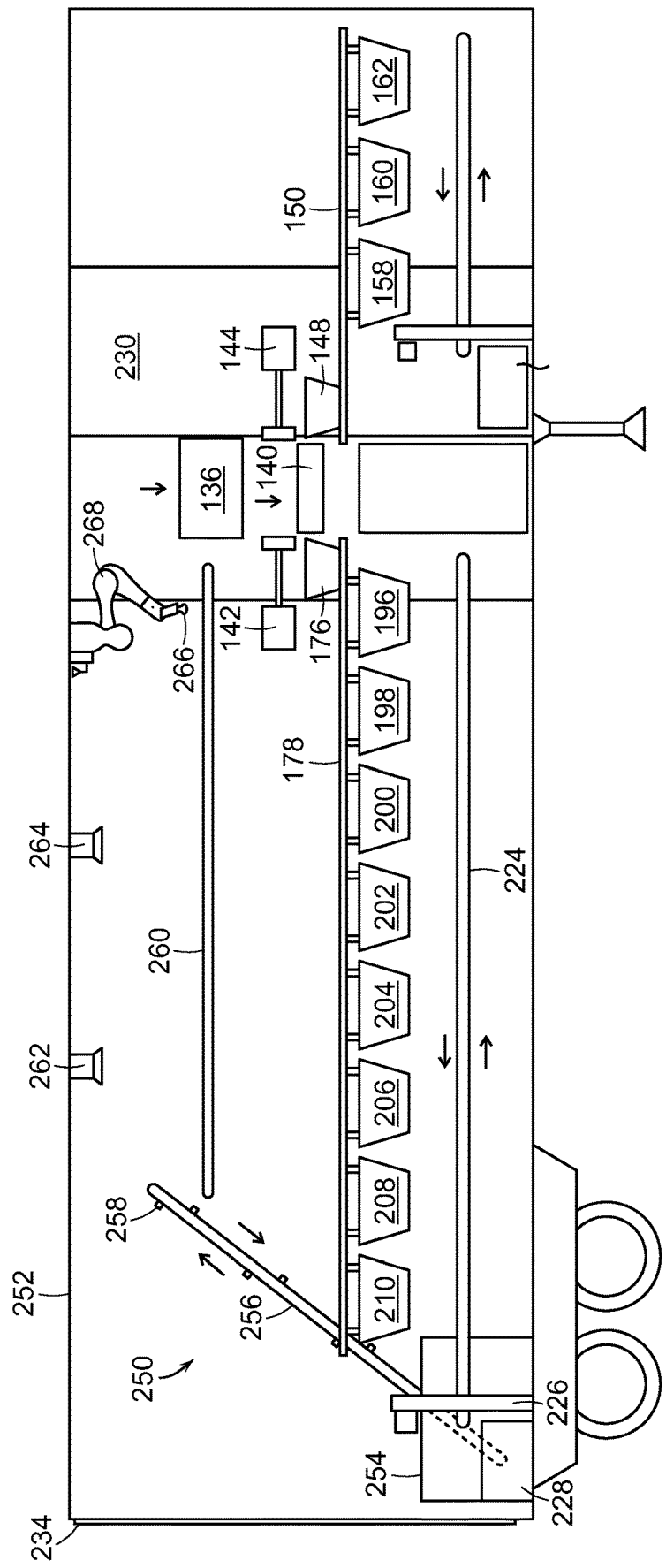
FIG. 20 shows an illustrative diagrammatic side view of an object processing system in accordance with another embodiment of the present invention, with the side wall of the trailer removed.
Figure 21:
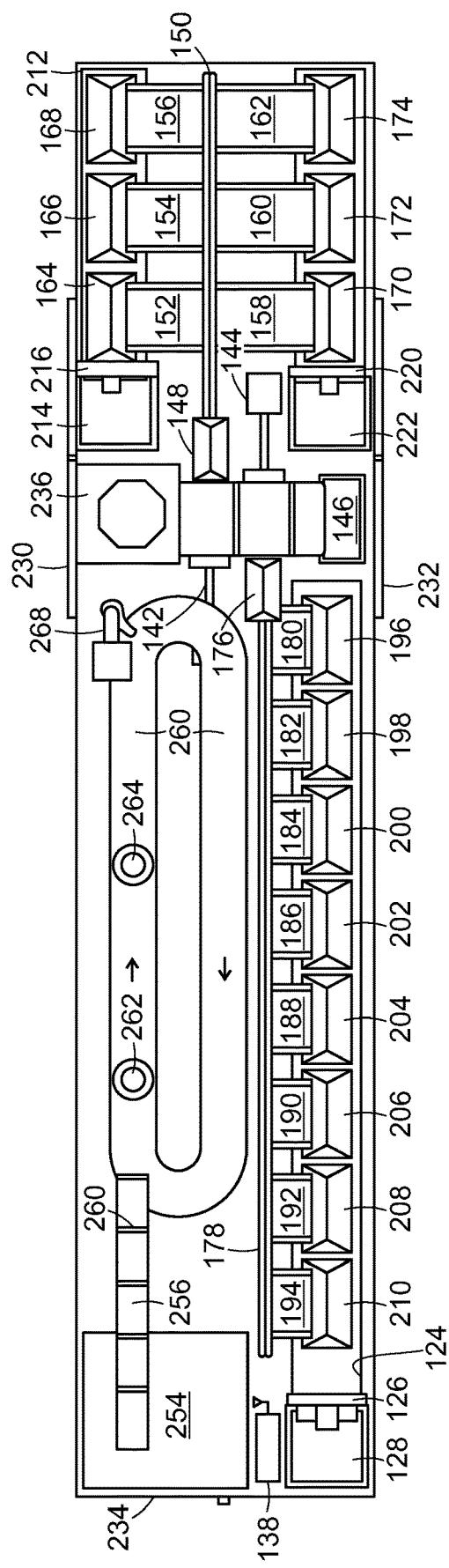
FIG. 21 shows an illustrative diagrammatic top view of the system of FIG. 20 with the top of the trailer removed.

FIGS. 20 and 21 show a system 250 in accordance with another embodiment of the present invention. In particular, FIG. 20 shows a side view of the system 250 within a trailer 252 (with a wall of the trailer removed for clarity), and FIG. 21 shows a top view of the system 250 (with the top of the trailer removed for clarity). The system 250 includes an infeed hopper 254 into which objects may be dumped, e.g., by a dumper or Gaylord. An infeed cleated conveyor 256 conveys objects from the infeed hopper 252 to a circular conveyor 258. The infeed conveyor 256 may include baffles 258 or cleats for assisting in lifting the objects from the hopper 254 onto the circular conveyor 260. A primary perception system may include one or more perception units 262, 264 that survey objects on the conveyor 260, in part, to identify certain objects for selection for inclusion in a singulated stream of objects that is provided directly to the drop perception unit 136. Objects remain on the conveyor 260 until they are selected for being grasped by an end effector 266 of a robotic system 268, and moved by the robotic system to be dropped into the drop perception unit 136.

Again, a singulated stream of objects are delivered to the drop perception unit 136 (as discussed below), and by providing a singulated stream of objects for processing, the system is able to more effectively control the object processing rate, and reducing the incidence of errors that may occur, for example of two objects in close contact with each other are perceived as being one object. The infeed conveyor 256 may also be in communication with a controller 138, and speed of the infeed conveyor 256 as well as the speed (and even direction) of the circular conveyor 260 may be adjusted to either slow down if moving too fast, or speed up if system determines that more bandwidth exists for a faster input. The remaining portions of the system 250 having reference numerals from FIGS. 18 and 19, are the same as the portions of the system 110 of FIGS. 18 and 19. Briefly, objects are identified by perception unit 136, and then routed to one of carriages 148, 176, then to any of drop containers 164, 166, 168, 170, 172, 174, 196, 198, 200, 202, 204, 206, 208, 210, ultimately bagged and labeled (e.g., when each container is full) and provided to one of the destination bins 214, 222, 228.

Figure 22:
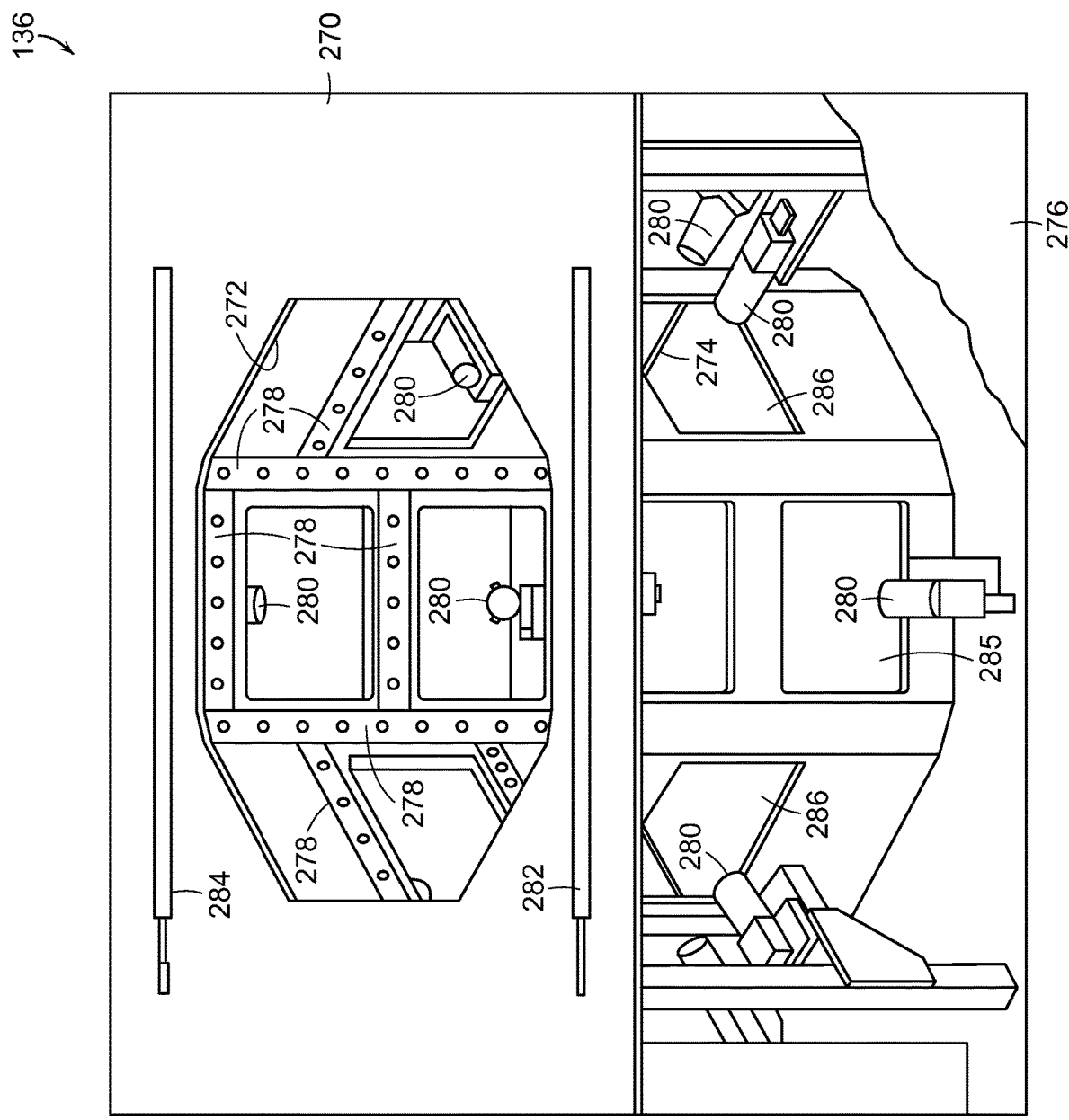
FIG. 22 shows an illustrative diagrammatic front view of the drop scanner system of FIGS. 18-21.
Figure 23:
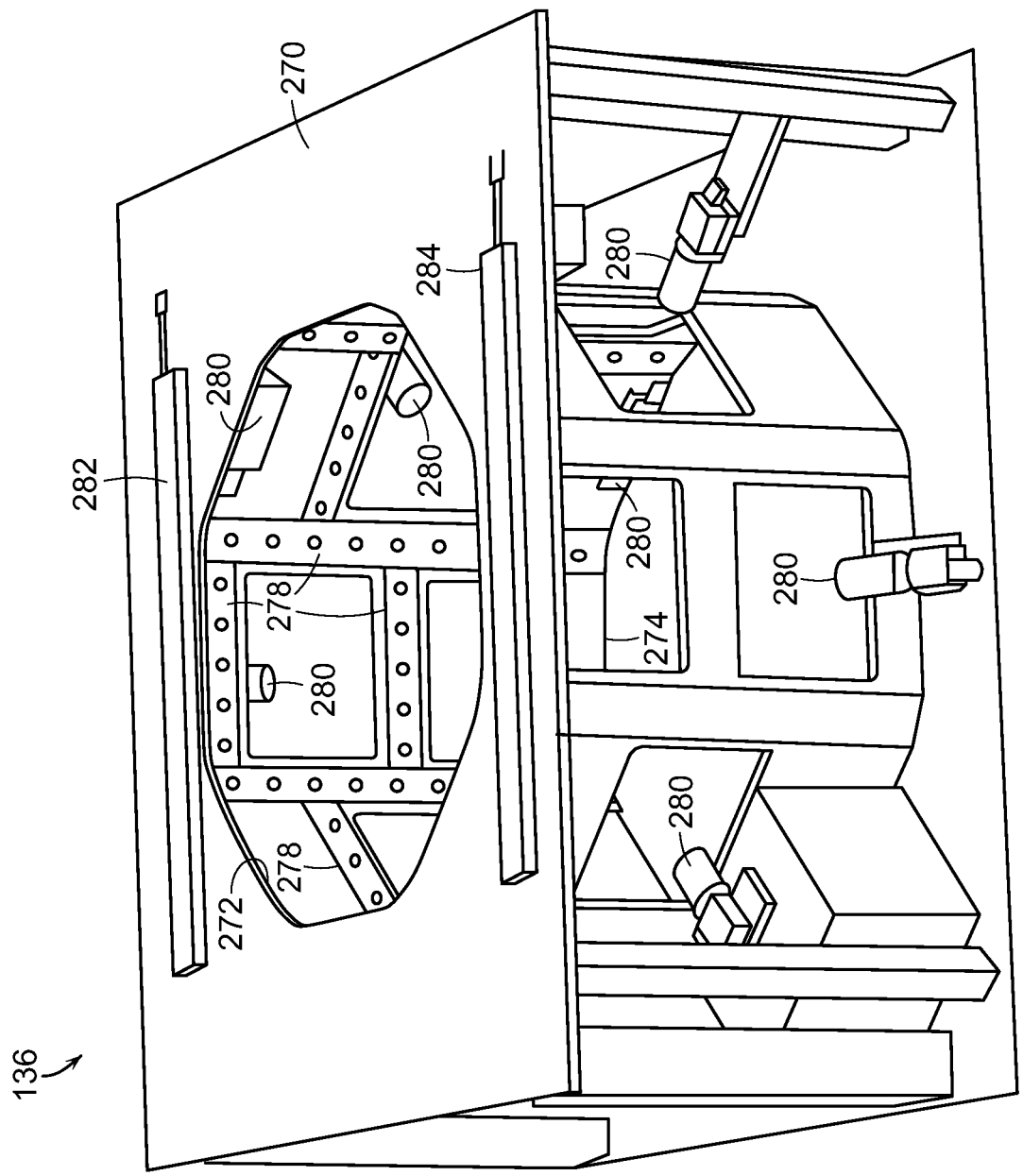
FIG. 23 shows an illustrative diagrammatic rear view of the drop scanner system of FIG. 22.

Portions of the systems 110 and 250 are described below in more detail. The perception unit 136 (which may be mounted to a side wall of the trailer, may be supported by stands or may be suspended from above) includes a stricture 270 having a top opening 272 and a bottom opening 274, and the walls may be covered by an enclosing material 276 as shown in FIGS. 22 and 23, e.g., a colored covering such as orange plastic, to protect humans from potentially dangerously bright lights within the drop scanner. The structure 270 includes a plurality of rows of sources (e.g., illumination sources such as LEDs) 278 as well as a plurality of image perception units (e.g., cameras) 280. The sources 278 are provided in rows, and each is directed toward the center of the opening. The perception units 280 are also generally directed toward the opening, although some cameras are directed horizontally, while others are directed upward, and some are directed downward. The system also includes an entry source (e.g., infrared source) 282 as well as an entry detector (e.g., infrared detector) 284 for detecting when an object has entered the perception unit 136. The LEDs and cameras therefore encircle the inside of the structure 270, and the cameras are positioned to view the interior via windows that may include a glass or plastic covering (e.g., 286).

An important aspect of systems of certain embodiments of the present invention, is the ability to identify via barcode or other visual markings (e.g., as shown at 305 in FIG. 24B) of objects, unique indicia associated with the object by employing a perception system into which objects may be dropped. Automated scanning systems would be unable to see barcodes on objects that are presented in a way that their barcodes are not exposed or visible. The perception system may be used in certain embodiments, with a robotic system that may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic system. Their size, weight and geometry are assumed to be such that the robotic system is able to pick, move and place them. These may be any kind of ordered goods, packages, parcels, or other articles that benefit from automated sorting. Each object is associated with unique identifying indicia (e.g., a barcode or a universal product code (UPC)), that identifies unique indicia associated with the object, or is associated with a unique location (e.g., a mailing address).

The manner in which inbound objects arrive may be for example, in one of two configurations: (a) inbound objects arrive piled in bins of heterogeneous objects; or (b) inbound articles arrive by a moving conveyor. The collection of objects includes some that have exposed bar codes and other objects that do not have exposed bar codes. The robotic system is assumed to be able to pick items from the bin or conveyor. The stream of inbound objects is the sequence of objects as they are unloaded either from the bin or the conveyor.

The manner in which outbound objects are organized is such that objects are placed in a bin, shelf location or container, into which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from the UPC of the object.

It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers. The symbol string uniquely associates the object, for example, with a set of processing instructions or a destination location.

The operations of the systems described herein are coordinated by the central control system 138 as shown in FIGS. 19 and 21. This system determines from symbol strings the unique indicia associated with an object, as well as the outbound destination for the object. The central control system is comprised of one or more workstations or central processing units (CPUs). The correspondence between unique indicia or mailing labels, and outbound destinations is maintained by the central control system in a database called a manifest. The central control system maintains the manifest by communicating with a warehouse management system (WMS).

During operation, the broad flow of work may be generally as follows. First, the system is equipped with a manifest that provides the outbound destination for each inbound object. Next, the system waits for inbound objects to arrive either in a bin or on a conveyor. The robotic system may pick one item at a time from the input bin, and may drop each item into the perception system discussed above, if the perception system successfully recognizes a marking on the object, then the object is then identified and forwarded to a sorting station or other processing station. If the object is not identified, the robotic system may either replace the object back onto the input conveyor and try again, or the conveyor may divert the object to a human sortation bin to be reviewed by a human.

The sequence of locations and orientations of the perception units 136 are chosen so as to minimize the average or maximum amount of time that scanning takes. Again, if the object cannot be identified, the object may be transferred to a special outbound destination for unidentified objects, or it may be returned to the inbound stream. This entire procedure operates in a loop until all of the objects in the inbound set are depleted. The objects in the inbound stream are automatically identified, sorted, and routed to outbound destinations.

In accordance with an embodiment therefore, the invention provides a system for sorting objects that arrive inbound bins and that need to be placed into a shelf of outbound bins, where sorting is to be based on a unique identifier symbol. Key specializations in this embodiment are the specific design of the perception system so as to maximize the probability of a successful scan, while simultaneously minimizing the average scan time. The probability of a successful scan and the average scan time make up key performance characteristics. These key performance characteristics are determined by the configuration and properties of the perception system, as well as the object set and how they are marked.

The two key performance characteristics may be optimized for a given item set and method of barcode labeling. Parameters of the optimization for a barcode system include how many barcode scanners, where and in what orientation to place them, and what sensor resolutions and fields of view for the scanners to use. Optimization can be done through trial and error, or by simulation with models of the object.

Optimization through simulation employs a barcode scanner performance model. A barcode scanner performance model is the range of positions, orientations and barcode element size that a barcode symbol can be detected and decoded by the barcode scanner, where the barcode element size is the size of the smallest feature on the barcode. These are typically rated at a minimum and maximum range, a maximum skew angle, a maximum pitch angle, and a minimum and maximum tilt angle.

Typical performance for camera-based barcode scanners are that they are able to detect barcode symbols within some range of distances as long as both pitch and skew of the plane of the symbol are within the range of plus or minus 45 degrees, while the tilt of the symbol can be arbitrary (between 0 and 360 degrees). The barcode scanner performance model predicts whether a given barcode symbol in a given position and orientation will be detected.

The barcode scanner performance model is coupled with a model of where barcodes would expect to be positioned and oriented. A barcode symbol pose model is the range of all positions and orientations, in other words poses, in which a barcode symbol will expect to be found. For the scanner, the barcode symbol pose model is itself a combination of an article gripping model, which predicts how objects will be held by the robotic system, as well as a barcode-item appearance model, which describes the possible placements of the barcode symbol on the object. For the scanner, the barcode symbol pose model is itself a combination of the barcode-item appearance model, as well as an inbound-object pose model, which models the distribution of poses over which inbound articles are presented to the scanner. These models may be constructed empirically, modeled using an analytical model, or approximate models may be employed using simple sphere models for objects and a uniform distributions over the sphere as a barcode-item appearance model.

Figure 24A:
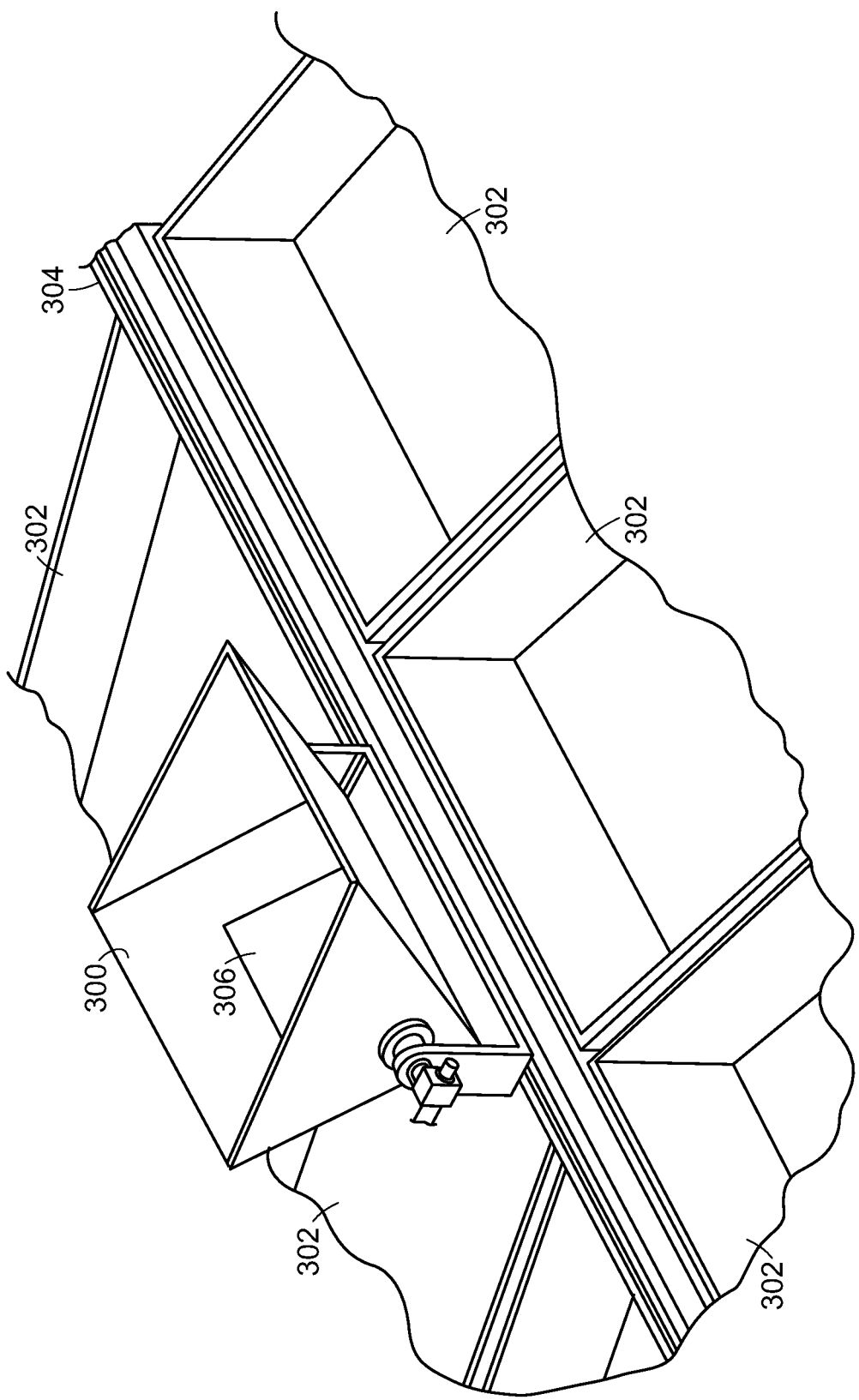
FIGS. 24A and 24B show illustrative diagrammatic views of a shuttle system of the system of FIGS. 18-21, wherein a carriage move between bins (FIG. 24A), and drops an object into a bin (FIG. 24B)
Figure 24B:
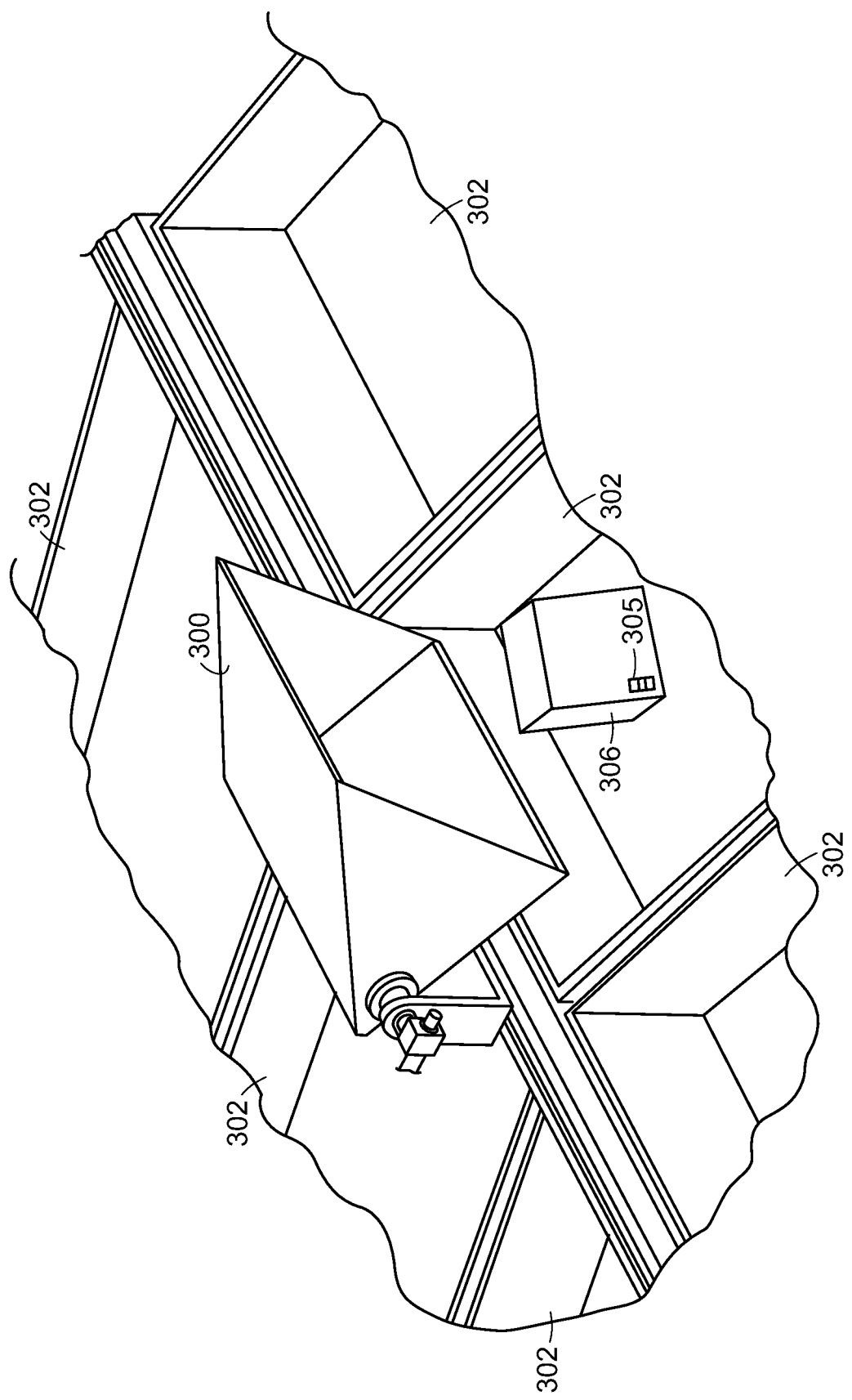

As further shown with reference to FIGS. 24A and 24B, each shuttle section (e.g., carriage 148 on track 150 and carriage 176 on track 178) includes a carriage (labelled 300 in FIGS. 24A and 24B) that shuttles back and forth among destination chutes 302 on track 304 (e.g., tracks 150, 178). The carriage 300 travels along the track 304 and carries objects to a desired destination chute, and tilts, dropping a contained object 306 into the desired destination chute (as shown in FIG. 24B). The chutes (e.g., chutes 152, 154, 156, 158, 160, 162, 180, 182, 184, 186, 188, 190, 192, 194 of FIGS. 18-21) lead to drop containers (e.g., drop containers 164, 166, 168, 170, 172, 174, 180, 182, 184, 186, 188, 190, 192, 194 of FIGS. 18-21). The central computing and control station 138 (shown in FIGS. 19 and 21) communicates with other computers distributed in the other components, and also communicates with the customer information system, provides a user interface, and coordinates all processes.

Figure 25A:
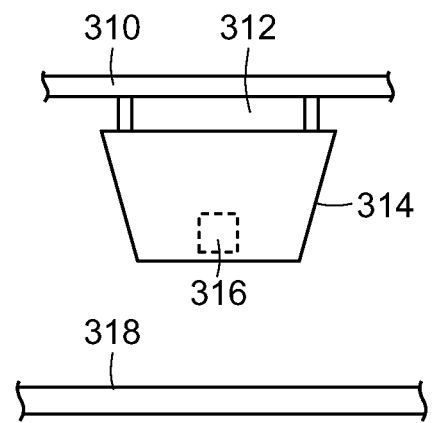
FIGS. 25A and 25B show illustrative diagrammatic side views of a drop carrier of the systems of FIGS. 1-4, wherein the drop carrier moves an object (FIG. 25A) and drops an object onto an output conveyor (FIG. 25B)
Figure 25B:
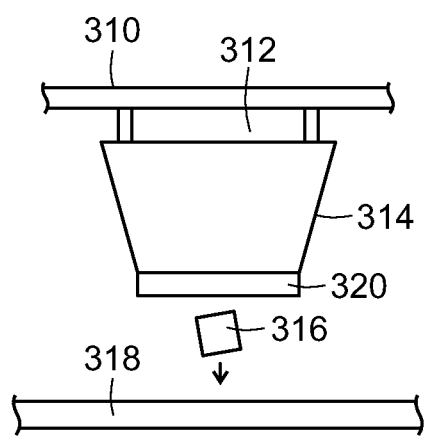

With reference to FIGS. 25A and 25B, the drop containers of the systems of FIGS. 18-21 may operate as follows. After a carriage (e.g., 148, 176, 300) on a track 310 (e.g., track 150, 178) drops an object into a chute 312 (e.g., chutes 152, 154, 156, 158, 160, 162, 180, 182, 184, 186, 188, 190, 192, 194), the object 316 lands in a drop container (e.g., drop containers 164, 166, 168, 170, 172, 174, 196, 198, 200, 202, 204, 206, 208, 210, 314). When the system determines that the drop container needs to be emptied, doors 320 on the bottom of the drop container 314 open, and the contents (e.g., object 316), fall to a conveyor 318 (e.g., conveyor 212, 218, 224), on which the contents travel toward destination bin (e.g., 214, 222, 228).

Figure 26A:
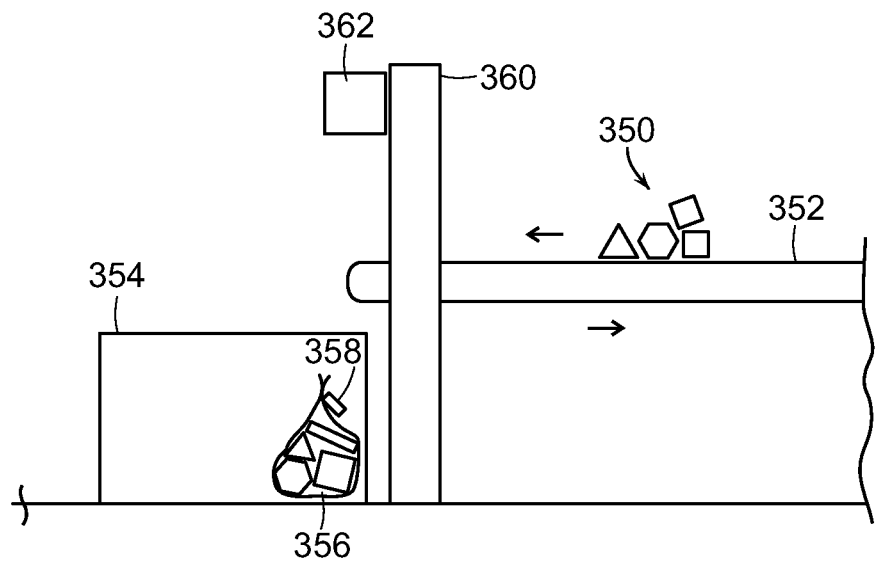
FIGS. 26A-26D show illustrative diagrammatic side views of a bagging and labelling system of the systems of FIGS. 18-21.
Figure 26B:
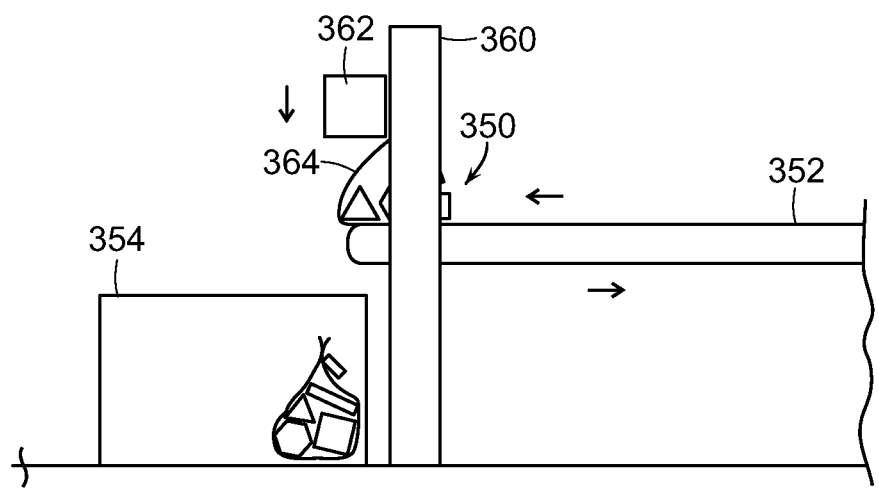
Figure 26C:
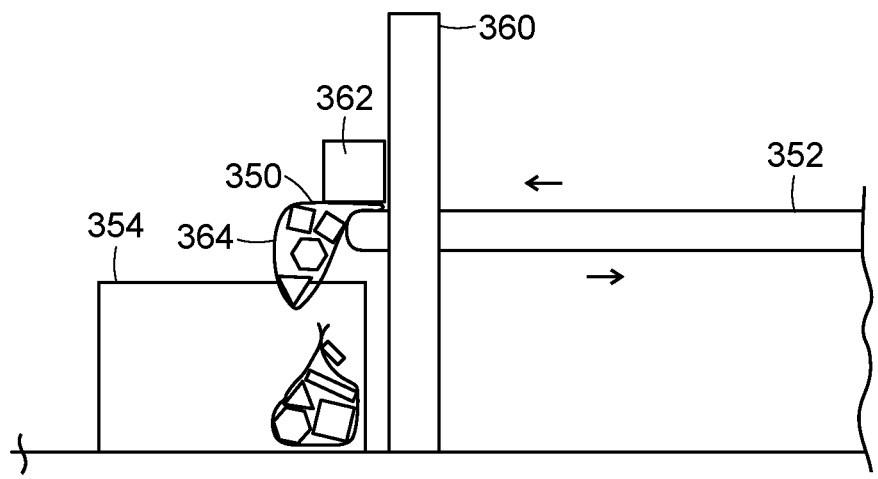
Figure 26D:
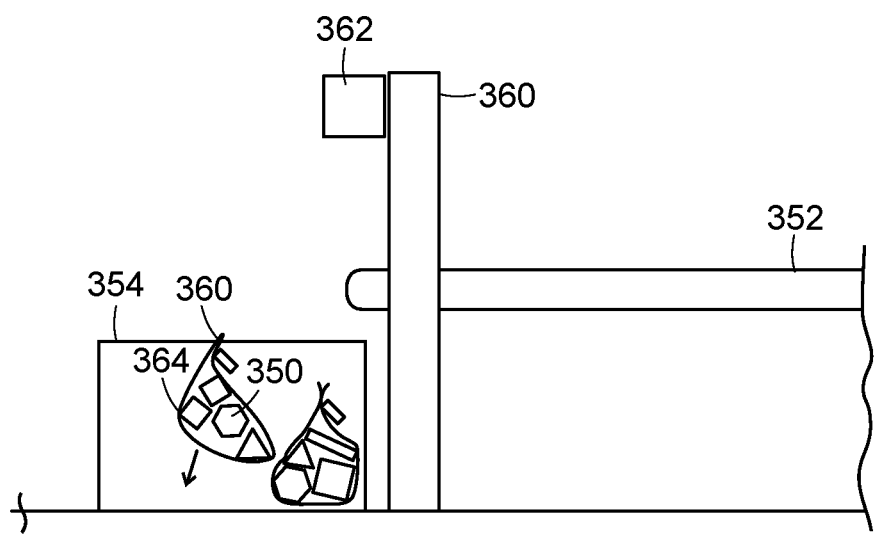

FIGS. 26A-26D show the operation of the automated bagging and labeling systems 216, 220, 226 of FIGS. 18-21). In particular, a conveyor 352 (e.g., conveyor 212, 218, 224) objects 350 (that came from a single destination bin) toward a destination bin 354 into which bagged and labelled objects are collected (e.g., bag 356 of objects bearing a label 358). Before dropping into the destination bin 354, the objects 350 pass through a bagging and labelling station 360 (e.g., bagging and labelling systems 216, 222, 226 of FIGS. 18-21). As the objects 350 pass through (FIG. 26B), they encounter a plastic sheet 364, which forms a bag around the objects with the assistance of an automated seal and labeling unit 362, which moves down toward the objects as they pass through the station 360. With reference to FIG. 26C, as the objects pass through the station 360, the ends of the plastic sheet 364 are brought together and sealed by the automated seal and labeling unit 362, which presses on the collected ends of the now formed bag, and prints and attaches a label 366 on the bag 362 of objects 350. The labelled and bagged group of objects 350 are then dropped into the destination bin 354 as shown in FIG. 26D, and the automated seal and labeling unit 362 returns to the starting position. The labelled bags of objects may be periodically removed from the truck for further processing.

Figure 27:
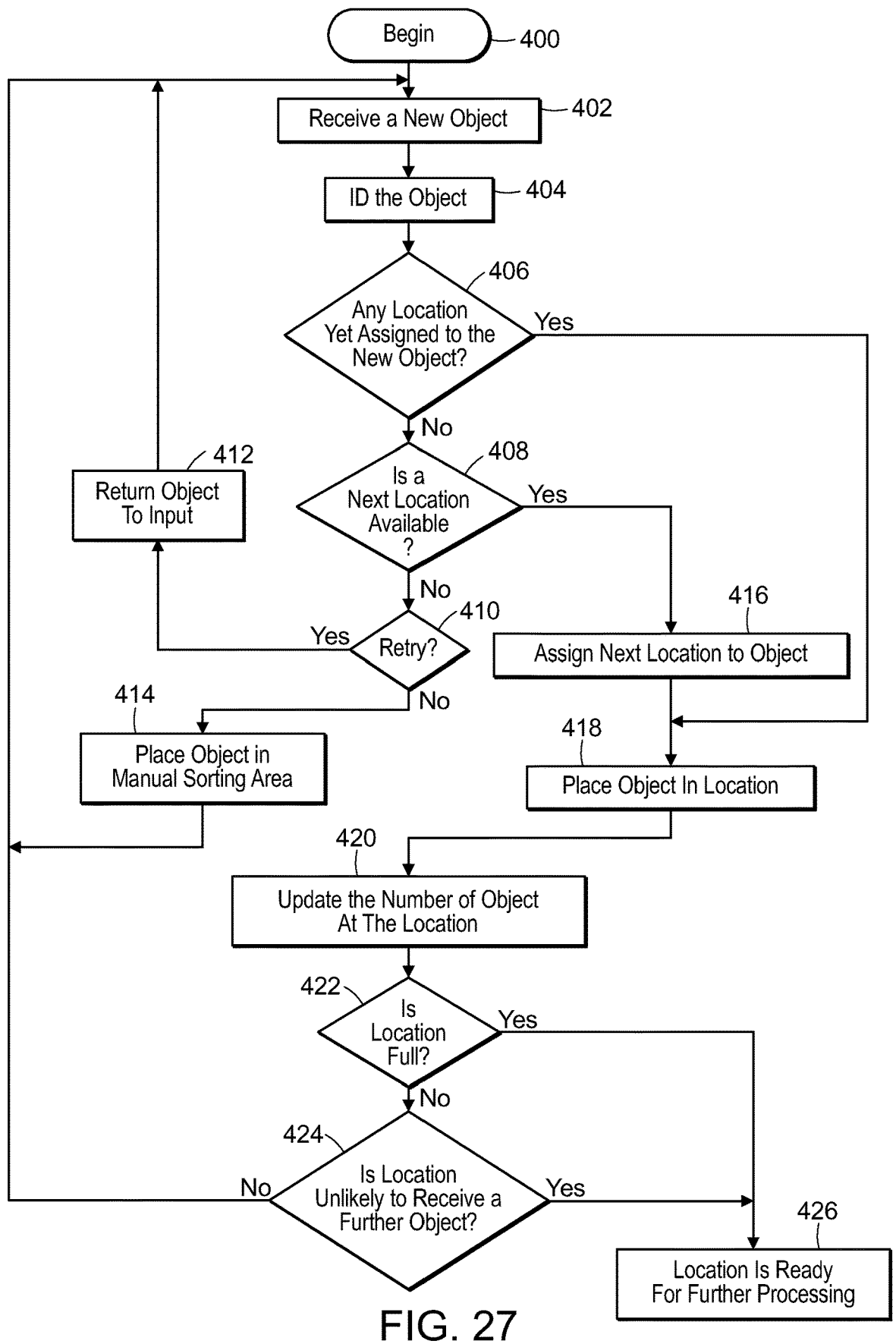
FIG. 27 shows an illustrative diagrammatic view of a flowchart showing selected processing steps in a system in accordance with an embodiment of the present invention.

As shown in FIG. 27, a sortation process of the invention at a sorting station may begin (step 400) by having a robotic system select, and grasp a new object from the input buffer (step 402) and then identify the new object (step 404). In certain embodiments, the system may first identify a new object and then select and grasp the identified object. The system then will determine whether the object is yet assigned to any collection bin (step 406). If not, the system will determine whether a next bin is available (step 408). If no next bin is available and the system decides to retry the object later (step 410), the robotic system will return the object to the input buffer (step 412) and return to step 402. If the system elects to not retry (step 410), the object is placed in a manual sorting area (step 414). Alternatively, the system can pick one of the collection bins that is in process and decide that it can be emptied to be reused for the object in hand, at which point the control system can empty the collection bin or signal a human worker to do it.

If a next bin is available (and the system may permit any number of bins per station), the system will then assign the object to a next bin (step 416). The system then places the object into the assigned bin (step 418), and updates the number of objects in the bin (step 420). The system them determines whether the bin is full (step 422) and if not, determines whether the bin is unlikely to receive a further object in the near future (step 424). If the answer to either is yes, the system indicates that the bin is ready for further processing (step 426). Otherwise, the system then returns to step 402 until finished.

Figure 28:
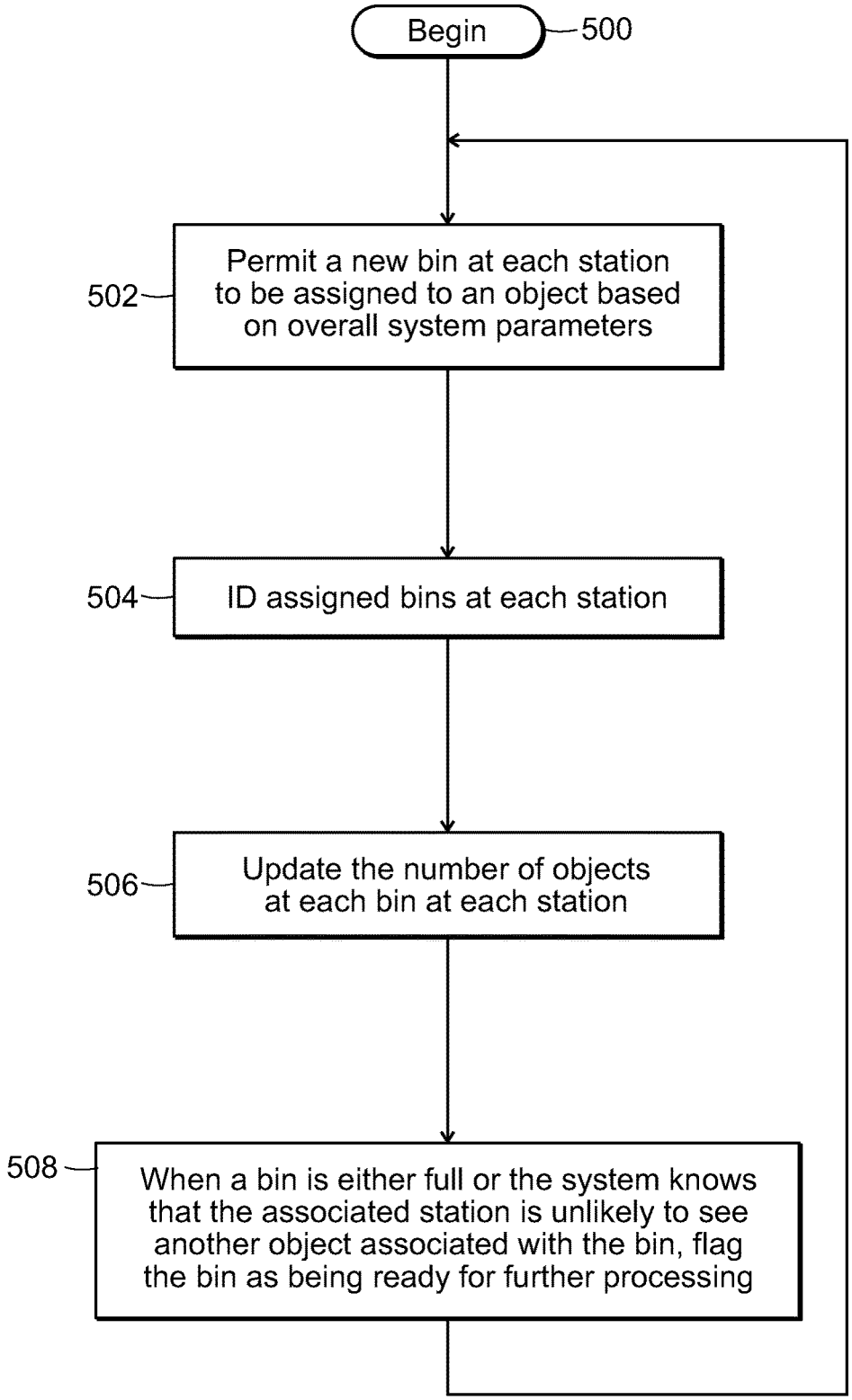
FIG. 28 shows an illustrative diagrammatic view of a flowchart showing bin assignment and management steps in a system in accordance with an embodiment of the present invention.

A process of the overall control system is shown, for example, in FIG. 28. The overall control system may begin (step 500) by permitting a new collection bin at each station to be assigned to a group of objects based on overall system parameters (step 502) as discussed in more detail below. The system then identifies assigned bins correlated with objects at each station (step 504), and updates the number of objects at each bin at each station (step 506). The system then determines that when a bin is either full or the system expects that the associated sorting station is unlikely to see another object associated with the bin, the associated sorting station robotic system will then place the completed bin onto an output conveyor, or signal a human worker to come and empty the bin (step 508), and then return to step 502.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

While the assignment of objects to destinations is fixed (e.g., each object has an identifier such as a label or barcode that is associated with an assigned destination), systems of certain embodiments may employ carriages or other containers that are not each fixed to assigned destinations, but rather may be dynamically assigned during operation. In other words, the system assigns carriages or containers to certain destination stations responsive to a wide variety of inputs, such as volume of objects being moved to a single destination, the frequency of sortation of the type of object, or even assigning the next available carriage or container destination associated with an acquired object.

The system provides in a specific embodiment an input system that interfaces to the customer's conveyors and containers, stores parcels for feeding into the system, and feeds those parcels into the system at a moderate and controllable rate. In one embodiment, the interface to the customer's process takes the form of a Gaylord dumper, but many other embodiments are possible. In one embodiment, feeding into the system is by an inclined cleated conveyor with overhead baffles. A key to the efficient operation of the system is to feed parcels in at a modest controlled rate. Many options are available, including variations in the conveyor slope and speed, the presence, size and structure of cleats and baffles, and the use of sensors to monitor and control the feed rate. Systems of the invention may incorporate software systems that interface with the distribution center's databases and other information systems, to provide operational information to the customer's system and to query the distribution center's system for parcel information. In each of the above embodiments, the systems may be powered by battery or wired AC, or may be electrically powered by a tractor trailer itself.

The systems in various embodiments, therefore, provide that an object engagement system indiscriminately engages objects as it moves through a trailer, and passes the objects on to an object conveyance system such that they may be conveyed to an object processing station.

Those skilled in the art will appreciate that numerous modifications and variations may be made to the above disclosed embodiments without departing from the spirit and scope of the present invention.

What is claimed is:

1. An object processing system for unloading objects from a trailer of a tractor trailer, said object processing system comprising:
   an engagement system including a movable unloading structure having a drive system for entering the trailer and a cleated conveyor supported by the movable unloading structure for indiscriminately engaging unidentified objects within the trailer, said engagement system further including guides configured along the cleated conveyor to urge engaged objects toward the center of the cleated conveyor; and
   a conveyance system including an extendable chute coupled to the movable unloading structure for conveying objects engaged by the cleated conveyor of the engagement system out of the trailer, wherein the extendable chute extends in response to the unloading structure moving into the trailer.

2. The system as claimed in claim 1, wherein the unloading structure of the engagement system includes a wheeled structure that moves into the trailer, the wheeled structure supporting the cleated conveyor.

3. The system as claimed in claim 1, wherein the system further includes at least one perception unit, wherein the at least one perception unit includes any of a camera and a scanner.

4. The system as claimed in claim 1, wherein the extendable chute conveys the engaged objects out of the trailer and into at least one bin.

5. The system as claimed in claim 1, comprising a further conveyance system for transporting the objects from the extendable chute toward a distribution location.

6. The system as claimed in claim 5, wherein the further conveyance system includes at least one other chute.

7. The system as claimed in claim 5, wherein the distribution location includes an object processing system inside a further trailer.

8. The system as claimed in claim 7, wherein the further conveyance system includes an in-feed conveyor that provides the objects to the further trailer.

9. The system as claimed in claim 7, wherein the object processing system provides a plurality of output stations within the further trailer where processed objects are provided.

10. An automated method of unloading objects from a trailer of a tractor trailer, comprising:
   moving an unloading structure into the trailer, wherein the unloading structure includes a cleated conveyor and an extendable chute;
   extending the extendable chute in response to the unloading structure moving into the trailer;
   indiscriminately engaging unidentified objects within the trailer using the cleated conveyor with the aid of a plurality of guides;
   conveying the engaged objects from the cleated conveyor out of the trailer through the extended chute; and
   transporting the objects toward a distribution location.

11. The method as claimed in claim 10, wherein the unloading structure is a wheeled structure that moves into the trailer.

12. The method as claimed in claim 10, further comprising receiving perception data from at least one perception unit, wherein the at least one perception unit includes any of a camera and a scanner.

13. The method as claimed in claim 10, wherein the distribution location includes an object processing system inside a further trailer.

14. The method as claimed in claim 13, wherein transporting the objects toward the destination location includes transporting the objects into the further trailer using a further conveyor positioned at an end of the extendable chute outside the trailer.

15. The method as claimed in claim 10, wherein the distribution location includes at least one bin.

16. The method as claimed in claim 10, wherein the distribution location includes an object processing system inside a further trailer.

17. The method as claimed in claim 16, wherein the method further includes providing the objects to the further trailer along an in-feed conveyor.

18. The method as claimed in claim 16, wherein the method further includes providing a plurality of output stations within the further trailer where processed objects are provided.

19. An object processing system for unloading objects from a trailer of a tractor trailer, said object processing system comprising:
   an engagement system including a movable unloading structure having a drive system for entering the trailer and a cleated conveyor supported by the movable unloading structure, said engagement system further including at least one front guide configured to urge objects near a side wall of the trailer toward the cleated conveyor for indiscriminately engaging unidentified objects within the trailer; and
   a conveyance system including an extendable chute coupled to the movable unloading structure for receiving and conveying objects engaged by the cleated conveyor of the engagement system out of the trailer, wherein the extendable chute extends in response to the unloading structure moving into the trailer.

20. The system as claimed in claim 19, wherein the unloading structure of the engagement system includes a wheeled structure that moves into the trailer, the wheeled structure supporting the cleated conveyor.

21. The system as claimed in claim 19, wherein the system further includes at least one perception unit, wherein the at least one perception unit includes any of a camera and a scanner.

22. The system as claimed in claim 19, wherein the extendable chute conveys the engaged objects out of the trailer and into at least one bin.

23. The system as claimed in claim 19, comprising a further conveyance system for transporting the objects from the extendable chute toward a distribution location.

24. The system as claimed in claim 23, wherein the further conveyance system includes at least one other chute.

25. The system as claimed in claim 23, wherein the distribution location includes an object processing system inside a further trailer.

26. The system as claimed in claim 25, wherein the further conveyance system includes an in-feed conveyor that provides the objects to the further trailer.

27. The system as claimed in claim 25, wherein the object processing system provides a plurality of output stations within the further trailer where processed objects are provided.

* * * * *